(12) United States Patent
Stevens et al.

(10) Patent No.: US 10,474,977 B2
(45) Date of Patent: *Nov. 12, 2019

(54) COGNITIVE LEARNING WORKFLOW EXECUTION

(71) Applicant: INTERNATIONAL BUSINESS MACHINES CORPORATION, Armonk, NY (US)

(72) Inventors: Molly Stevens, Poughkeepsie, NY (US); Kirsten Brunner McDonald, Poughkeepsie, NY (US); Charlie Bryant, Binghamton, NY (US); Philip Siconolfi, Wappingers Falls, NY (US); Marna Walle, Pawling, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/795,381

(22) Filed: Oct. 27, 2017

(65) Prior Publication Data

US 2019/0129762 A1 May 2, 2019

(51) Int. Cl.
*G06Q 10/06* (2012.01)
*G06F 9/48* (2006.01)
*G06N 5/02* (2006.01)

(52) U.S. Cl.
CPC ......... *G06Q 10/0633* (2013.01); *G06F 9/485* (2013.01); *G06N 5/02* (2013.01)

(58) Field of Classification Search
CPC ....... G06Q 10/0633; G06F 9/485; G06N 5/02
See application file for complete search history.

(56) References Cited

U.S. PATENT DOCUMENTS

| 6,966,049 B2 | 11/2005 | Lepejian et al. |
| 8,386,407 B2 | 2/2013 | Meliksetian et al. |

(Continued)

FOREIGN PATENT DOCUMENTS

CN    103208046 A    7/2013

OTHER PUBLICATIONS

International Search Report; International Application No. PCT/IB2018/058234; International Filing date: Oct. 23, 2018; dated Jan. 9, 2019; 9 pages.

(Continued)

*Primary Examiner* — Benjamin C Wu
(74) *Attorney, Agent, or Firm* — Cantor Colburn LLP; William Kinnaman

(57) ABSTRACT

Technical solutions are described for interactively executing a workflow that includes multiple workflow steps. An example method includes pulling a preliminary update for the workflow from a data source and modifying the workflow dynamically. The method further includes selecting a workflow step, and pulling updated information from the data source and modifying the workflow step dynamically. Further, the method includes retrieving, from the data source, first results information, indicative of results of executing the updated workflow step by other users, and based on the first results information, executing the updated workflow step. The method further includes accumulating a second results information based on the execution of the workflow step. Further, the execution includes pushing the second results information to the data source upon completion of the workflow step.

20 Claims, 9 Drawing Sheets

(56) References Cited

U.S. PATENT DOCUMENTS

| | | | |
|---|---|---|---|
| 8,396,838 | B2 | 3/2013 | Brockway et al. |
| 8,442,852 | B2 | 5/2013 | Sun et al. |
| 8,595,044 | B2 | 11/2013 | Bernardini et al. |
| 8,639,555 | B1 | 1/2014 | Johnston |
| 8,763,006 | B2 | 6/2014 | Bobak et al. |
| 9,116,746 | B2 | 8/2015 | Shafiee et al. |
| 9,256,418 | B2 | 2/2016 | Ran et al. |
| 9,501,473 | B1* | 11/2016 | Kong .................. G06F 9/46 |
| 2003/0195763 | A1 | 10/2003 | Gulcu et al. |
| 2004/0216084 | A1 | 10/2004 | Brown et al. |
| 2007/0276714 | A1 | 11/2007 | Beringer |
| 2008/0244565 | A1* | 10/2008 | Levidow ............ G06F 9/5038 717/176 |
| 2009/0018882 | A1 | 1/2009 | Burton et al. |
| 2009/0064130 | A1* | 3/2009 | Davis .................. G06F 8/10 717/173 |
| 2009/0064171 | A1* | 3/2009 | Davis .................. G06Q 10/06 718/106 |
| 2009/0204897 | A1* | 8/2009 | Sogge .................. G06Q 10/06 715/700 |
| 2010/0293538 | A1* | 11/2010 | Wolf .................. G06F 8/65 717/170 |
| 2011/0161284 | A1* | 6/2011 | Tewari .................. G06F 16/254 707/609 |
| 2012/0096348 | A1 | 4/2012 | Nagamine et al. |
| 2012/0167095 | A1* | 6/2012 | Owen ................ G06Q 10/0631 718/100 |
| 2014/0195258 | A1 | 7/2014 | Burton et al. |
| 2015/0067687 | A1* | 3/2015 | Turner .................. G06F 9/4881 718/102 |
| 2015/0081326 | A1 | 3/2015 | Krishnapuram et al. |
| 2017/0068608 | A1* | 3/2017 | Covell ................ G06F 11/3409 |
| 2017/0006141 | A1 | 5/2017 | Bhadra |
| 2017/0124462 | A1 | 5/2017 | Arbajian et al. |
| 2017/0286199 | A1* | 10/2017 | Soini .................. G06F 11/079 |
| 2018/0307384 | A1* | 10/2018 | Garrison .............. G06F 3/0482 |
| 2019/0019130 | A1* | 1/2019 | Gentilhomme .. G06Q 10/06316 |
| 2019/0129746 | A1* | 5/2019 | Stevens .................. G06F 9/46 |
| 2019/0129748 | A1* | 5/2019 | Stevens .................. G06F 9/485 |
| 2019/0129759 | A1* | 5/2019 | Stevens .................. G06F 9/5038 |
| 2019/0129762 | A1* | 5/2019 | Stevens .................. G06N 5/02 |
| 2019/0130325 | A1* | 5/2019 | Stevens .................. G06N 20/00 |

OTHER PUBLICATIONS

Abdullah et al., "Applying agent technology to facilitate knowledge sharing among bioinformatics communities of practice," IJCSNS, vol. 8 No. .4, Apr. 2008, pp. 1-8.

An et al., "An event-based formal framework for dynamic software update," Software Quality, Reliability and Security (QRS), IEEE International Conference on. IEEE, 2015, pp. 1-10.

Authors et. al.: IBM, "System and method for Quality of Service—Monitoring in Workflow Systems using Data Mining echniques," ip.com, IPCOM000154199D, Jun. 21, 2007, pp. 1-7.

Disclosed Anonymously, "Method and apparatus for a cognitive configuration management service," ip.com, IPCOM000248102D, Oct. 26, 2016, pp. 1-5.

Disclosed Anonymously, "System and Method for Automatically Matching Students and Tutors Based on Derived Cognitive Styles in Massive Online Learning," ip.com, IPCOM000247038D, Jul. 28, 2016, pp. 1-4.

Hayden et al., "Specifying and Verifying the Correctness of Dynamic Software Updates," VSTTE 12, 2012, pp. 1-29.

Mnaouer et al., "A generic framework for rapid application development of mobile Web services with dynamic workflow management," Services Computing, (SCC 2004), Proceedings. IEEE International Conference on. IEEE, 2004, pp. 1-7.

Nam et al., "Integrated modeling workflow for security assurance," International Symposium on Leveraging Applications of Formal Methods, Springer International Publishing, 2016, pp. 1-16.

Verdi et al., "Conceptual-Level Workflow Modeling of Scientific Experiments using NMR as a Case Study," BMC Bioinformatics, BioMed Central, Jan. 30, 2007, pp. 1-12.

Wu et al., "Workflow Security Access Model Based on Dynamic Control Mechanism," Computer Engineering, 2012, pp. 1-2.

List of IBM Patents or Patent Applications Treated as Related; Date Filed: Jun. 11, 2019, 2 pages.

* cited by examiner

COGNITIVE LEARNING WORKFLOW EXECUTION

BACKGROUND

The present invention generally relates to an improvement to a computer system such as a system for executing workflows.

Recently, with the availability and prevalence of computing devices, providing workflows to customers or other users to perform specific tasks with machine assistance, is becoming common. Such a workflow includes a list of workflow steps, which may be a compilation of operations that a user executes with machine assistance in a specific order provided by the workflow.

SUMMARY

According to one or more embodiments computer-implemented method for executing an interactive workflow includes selecting a workflow for interactive execution, the workflow includes a sequence of workflow steps. The method further includes pulling a preliminary update for the workflow from a data source and modifying the workflow dynamically. The method further includes selecting a workflow step from the workflow for execution, and pulling updated information for the workflow step from the data source and modifying the workflow step dynamically using the updated information. Further, the method includes retrieving, from the data source, first results information, the first results information indicative of results of executing the updated workflow step by other users. The method further includes in response to the first results information indicative of performing an execution, executing the workflow step using the updated workflow step, the execution changes a target system. The method further includes accumulating execution information including attributes associated with execution of the workflow step, and a second results information based on the execution of the workflow step. Further, the method includes pushing the execution information to the data source upon completion of the workflow step.

According to one or more embodiments a system for interactively executing a workflow includes a memory and a processor coupled with the memory. The interactive execution includes selecting a workflow for interactive execution, the workflow includes a sequence of workflow steps. The execution further includes pulling a preliminary update for the workflow from a data source and modifying the workflow dynamically. The execution further includes selecting a workflow step from the workflow for execution, and pulling updated information for the workflow step from the data source and modifying the workflow step dynamically using the updated information. Further, the execution includes retrieving, from the data source, first results information, the first results information indicative of results of executing the updated workflow step by other users. The execution further includes in response to the first results information indicative of performing an execution, executing the workflow step using the updated workflow step, the execution changing a target system. The execution further includes accumulating execution information including attributes associated with execution of the workflow step, and a second results information based on the execution of the workflow step. Further, the execution includes pushing the execution information to the data source upon completion of the workflow step.

According to one or more embodiments a computer program product includes a computer readable storage medium having program instructions embodied therewith, the program instructions are executable by a processing circuit to cause the processing circuit to provide machine-assisted workflow execution. The interactive execution includes selecting a workflow for interactive execution, the workflow includes a sequence of workflow steps. The execution further includes pulling a preliminary update for the workflow from a data source and modifying the workflow dynamically. The execution further includes selecting a workflow step from the workflow for execution, and pulling updated information for the workflow step from the data source and modifying the workflow step dynamically using the updated information. Further, the execution includes retrieving, from the data source, first results information, the first results information indicative of results of executing the updated workflow step by other users. The execution further includes in response to the first results information indicative of performing an execution, executing the workflow step using the updated workflow step, the execution changes a target system. The execution further includes accumulating execution information including attributes associated with execution of the workflow step, and a second results information based on the execution of the workflow step. Further, the execution includes pushing the execution information to the data source upon completion of the workflow step.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
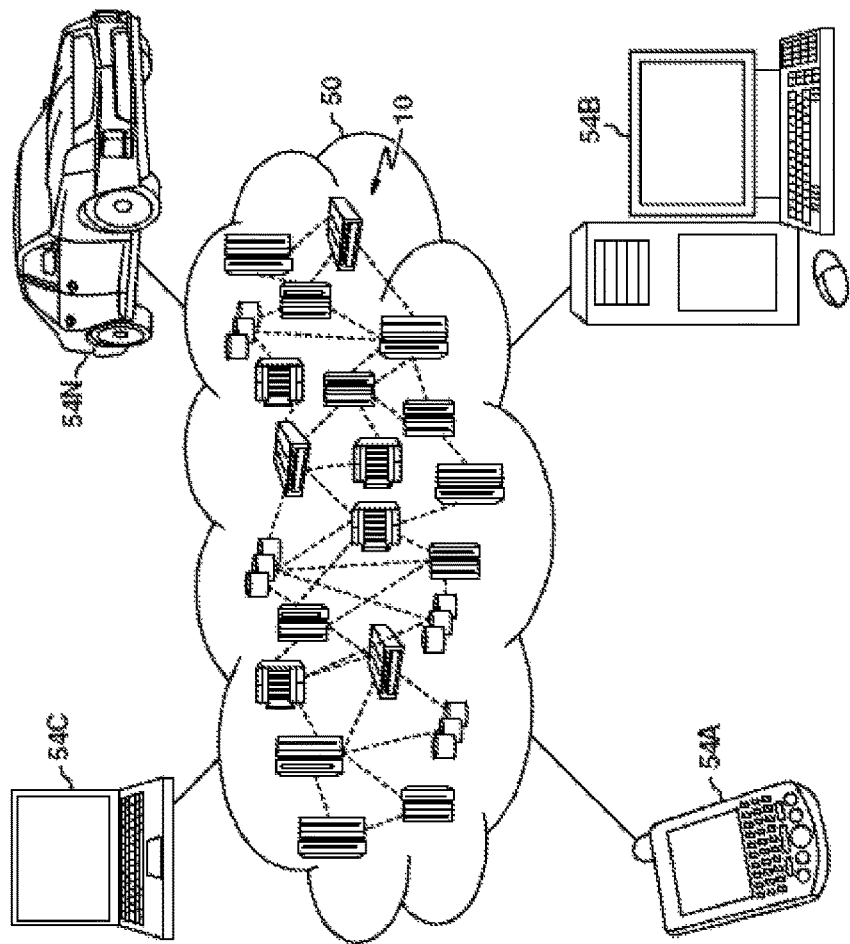
FIG. 1 depicts a cloud computing environment according to an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The technical solutions described herein facilitate updating a workflow provided to a user for execution, the update is performed in an online and dynamic manner, while the workflow is being executed by the user. A workflow is a list of operations that the user is provided to execute in a specific order according to the workflow. In one or more examples, one or more operations (workflow steps) of the workflow may alter a machine, for example, a machine on which the workflow is being executed. In one or more examples, the workflow is provided to the user on a first machine, and the workflow is executed on a second machine. In one or more examples, the one or more workflow steps from the workflow are executed manually. Alternatively, or in addition, one or more workflow steps may be executed in an automated manner. In one or more examples, the workflow is executed as a combination of manual and automated steps.

Examples of a workflow include a list of workflow steps for changing the hardware of a machine, for example, updating/replacing memory device from a computer, updating/replacing a battery from an automobile, changing a gear from a printer, or any other hardware change for a machine. Alternatively, or in addition, examples of a workflow include a list of workflow steps for changing software associated with a machine, for example updating/replacing an operating system, updating/replacing a software system, changing a configuration of a machine, such as encrypting the memory, setting one or more options of the software system, or any other software change for a machine. It is understood that above are just a few examples of a workflow and that the technical solutions described herein are applicable to other examples of workflow, in addition to the examples listed and/or described herein.

Technical challenges with the execution of a workflow include that of updating the workflow with information for assisting with the execution of the one or more workflow steps as each of the workflow steps is being executed. For example, a lot more information than just what is provided by the owner (provider/developer) of the workflow, and without such information being provided/available to the user, s/he may not be able to execute the workflow step. The technical solutions described herein address such a technical challenge by facilitating providing of such missing information prior to/or at the time the workflow step is being executed.

For example, the technical solutions described herein facilitate determining and providing such missing information from multiple data sources. For example, the data sources may include updates from the workflow developer. For example, if the workflow is updated or corrected by the developer (the vendor or owner that designed the workflow), then that updated information is provided to the user. Such information is referred to as "vendor update information" in further description.

Further, the data sources may include updates from other users that have executed that same workflow, the other user is from a different domain than the user that is executing the workflow. A different domain here may refer to users that have executed the workflow in a different environment than the user, for example, if the other user is from a different organization than the user, and the workflow affects/uses organization information, for example, updating an organizational server, and the like. Another example of different domains may include the users executing the same workflow on different hardware, different operating system, and the like. It is understood that various other examples of two or more users from different domains are possible, the two or more users executing the same workflow in their respective domain environment. In any of such cases, is another user from the different domain that has executed that same workflow has information to share about the workflow execution, then such shared information is identified and provided to the user by the technical solutions described herein. Such information is referred to as "other user information" in further description.

Further yet, the data sources may include updates that the same user had when s/he executed a similar workflow before, for example another workflow with one or more common workflow steps as the workflow being executed. For example, the user may have added specific information to/about a workflow step into a data source; in such cases, that information is shared with the other workflow by the technical solutions described herein. Such information is referred to as "domestic information" in further description.

Further, the data sources may include updates from other sources from the outside world, referred further herein as "other user information." Such information includes information that is automatically identified and provided from one or more sources like one or more social media data sources, such as TWITTER™, LINKEDIN™, FACE-BOOK™, one or more forums and/or blog data sources, such as REDDIT™, QUORA™, and other such data sources available via the Internet.

Missing information obtained and provided to the user when executing the workflow includes, but is not limited to, skill level feedback, time feedback, impact feedback. Further, the missing information includes ratings for one or more workflow steps, for example, easy vs. difficult, thumbs up vs. thumbs down indicating whether to perform a step, helpful vs. not helpful indicating if the workflow step provided expected result(s), critical or not indicating whether the workflow step may be skipped, and the like. Alternatively, or in addition, the information may include a rating, such as a star rating indicating a summary of information available for the workflow step. Further, the missing information may include prior information from other workflows that the same user has done, such as comments, notes, step ownership, notepad information, workflow history files, and the like. Information from the social media or other Internet sources may include hints and tips might be from other users who have executed the workflow. The missing information provided to the user may further include a product problem information from the vendor, such as a defect information or corrections, patches, updates, etc.

Such information is accumulating continuously as various users execute the workflow. However, there is a point in time when each user has to perform/execute the workflow, so it is desirable that the user gets "up to the minute" additional information when executing the workflow. The technical solutions described herein address such a technical challenge of updating the workflow with missing information by automatically identifying and providing such updates from multiple data sources to the user when executing the workflow, thus providing up to the minute updates from multiple data sources.

The technical solutions described herein may be implemented using cloud computing in one or more examples. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
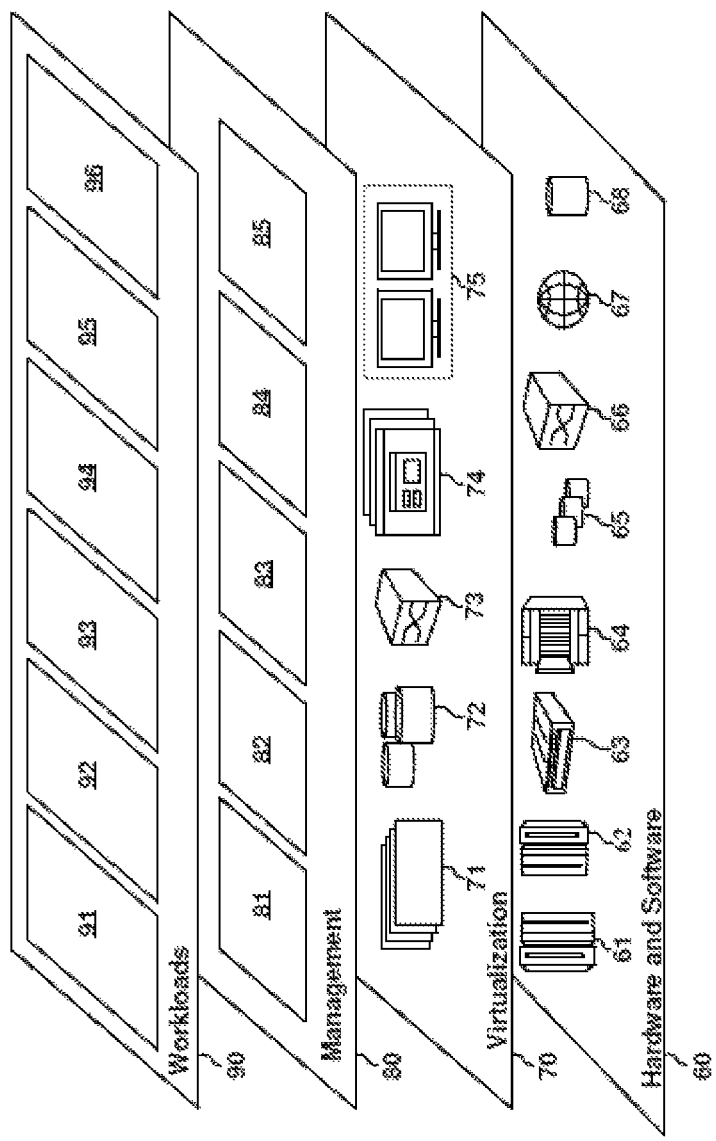
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workflow execution processing 96.

Figure 3:
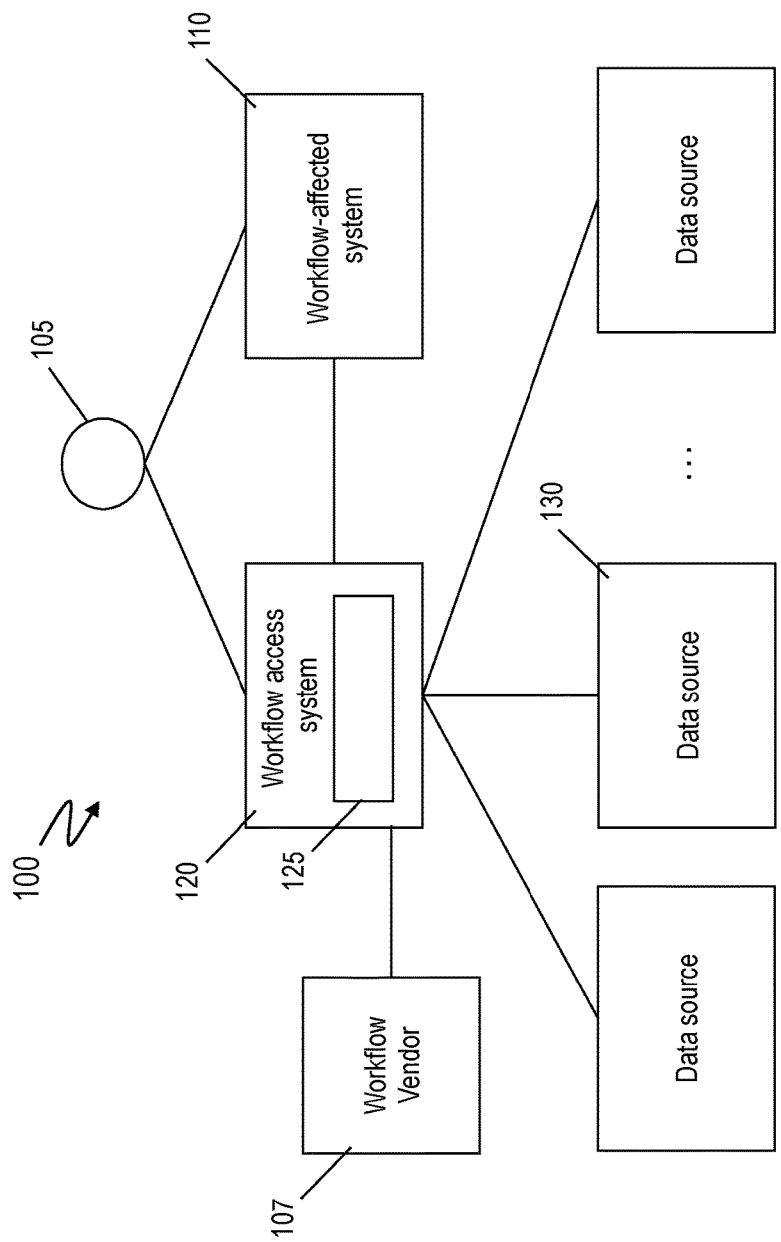
FIG. 3 depicts an example system 100 for execution of a workflow using cognitive learning.

FIG. 3 depicts an example system 100 for executing a workflow according to one or more embodiments of the present invention. The system 100 facilitates execution of a workflow using cognitive learning. The system 100 includes a workflow access system 120 that provides a workflow executor 105 to access a workflow 125. The workflow 125 is to modify a component and/or configuration of a workflow-target system 110. It should be noted that although the workflow access system 120 and the workflow-access system 110 are depicted as two separate systems in FIG. 3, in one or more examples, the two may be one and the same system.

The workflow 125 may be provided by a vendor and/or developer of the workflow-target system 110. The workflow 125 includes one or more workflow steps that are to be executed by the workflow executor 105. The workflow 125 is assigned a unique identifier. Further, in one or more examples, each of the workflow steps is assigned a unique identifier. In one or more examples, the workflow steps are to be executed in a specific sequence provided by the workflow 125. The workflow 125 is thus a machine-assisted workflow that is executed by the workflow executor 105. The workflow executor 105 may be a user that executes each of the workflow steps from the workflow 125. Alternatively, the workflow executor 105 is a machine that executes the workflow steps from the workflow 125 automatically, or semi-automatically.

The system 100 further includes one or more data sources 130 that are used to update the workflow 125. The data sources 130 may be one or more server computers. In one or more examples, the data sources 130 include a vendor data source 130 that stores updated workflow steps and/or information for the workflow 125. The vendor data source 130 may be provided by the vendor/creator/developer of the workflow 125. In one or more examples, the workflow 125 includes an access location, such as an IP address, or any other access information of the vendor data source 130 to access information associated with the workflow 125. In one or more examples, the vendor data source 130 maintains the information associated with a unique identifier of the workflow 125 and further associated with unique identifiers of one or more workflow steps from the workflow. The data associated with the workflow and the workflow steps can be specifically identified in the vendor data source 130 by the workflow access system 120, for example using an application programming interface (API) provided by the vendor data source 130. It is understood that other techniques for accessing the data may be used, apart from the API, in other examples.

Alternatively, or in addition, the data sources 130 include a domestic data source that stores "domestic information" from within the organization of the workflow executor 105, the domestic information being specific to the organization. For example, if the workflow 125 is being executed in an organization such as SEARS™, the workflow executor 105 may use parameters, such as employee numbers, server names, filenames, protocols, customer identification data, supplier identification data, and the like, during execution of one or more workflow steps, such parameters being specific to SEARS™. Such information may be sensitive information that is not to be made public. Further, such information may be useful only when executing the workflow step(s) within the SEARS™ organization and may cause an error (such as workflow failure or incorrect results) when executing the workflow step(s) in a different organization. Accordingly, the data sources 130 may include the domestic information data source 130 that stores data specific to the workflow execution within the organization of the workflow executor 105. Alternatively, or in addition, the organization may specific to the workflow-target system 110, and not to the workflow executor 105.

Further, the data sources 130 include other user data sources 130, which are "open" data sources that are accessible via the Internet and provide information provided by other users of the workflow 125 (referred to as "other user information"). For example, the other user data sources 130 may include social media servers (e.g. FACEBOOK™, LINKEDIN™, TWITTER™ etc.), blogs of other workflow executors (e.g. WORDPRESS™ etc.), forums (QUORA™, REDDIT™ etc.), or any other data source that is accessible via the Internet, and that facilitates the workflow access system 120 to retrieve information associated with the workflow 125 and/or the workflow steps.

The workflow executor 105 may specify which data sources 130 to use for a particular workflow 125, and indicate the type of data that is to be stored or retrieved from the data sources 130. It should be noted that the data source types provided above are a few examples, and that additional and/or different data source types may be used in other examples.

Updating the workflow 125 includes updating one or more of the workflow steps. In one or more examples, the workflow access system 120 updates the workflow 125. The updates may be performed in response to a request from the workflow executor 105, in one or more examples. The workflow access system 120 updates the workflow 125 using cognitive learning techniques, such as machine learning algorithms. For example, the workflow access system 120 uses algorithms like neural networks, Bayesian, clustering, regression, decision tree, regularization, and the like or a combination thereof. The workflow access system 120 uses update information available from the data sources 130 to revise one or more workflow steps from the workflow 125. In one or more examples, the workflow access system 120 uses the identifiers of the workflow 125 and/or the identifiers of the workflow steps to identify update information available from the data sources for the specific workflow 120 and/or the workflow steps.

Further yet, the workflow access system 120 facilitates the workflow executor 105 to update the data sources 130 with information associated with the execution of the workflow 125 by the workflow executor 105. For example, the workflow executor 105 provides his/her update information based on his/her experience executing a workflow step from the workflow 125, or executing the entire workflow 125.

The workflow execution system 100 thus updates/revises the workflow 125 based on one or more feedback update information from the data sources 130. Further, the workflow execution system 100 facilitates updating the data sources 130 with the feedback update information from the workflow executor 105 after completion of a workflow step and/or upon completion of execution of the workflow 125. The workflow execution system 100 uses the unique identifiers of the workflow steps and/or the workflow 125 to access, receive, and/or update the respective feedback information.

Figure 4:
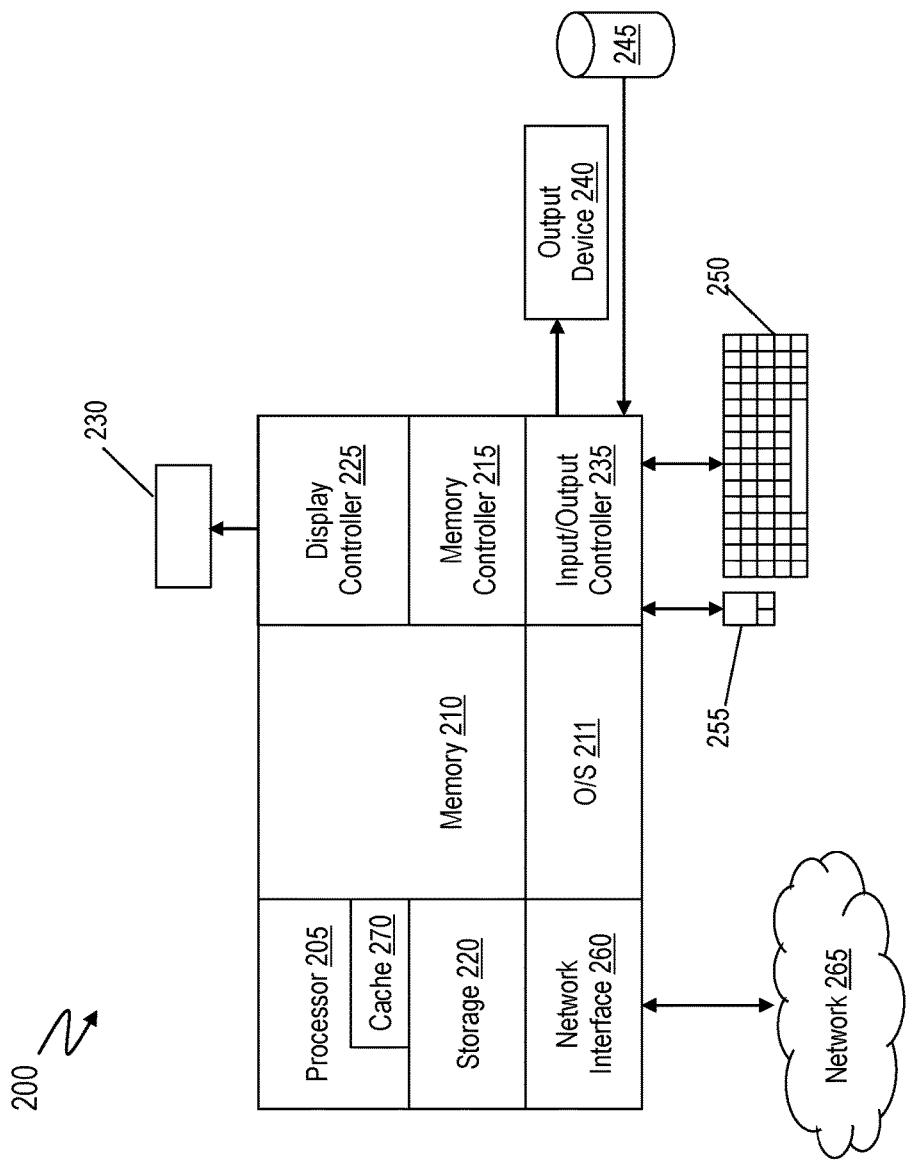
FIG. 4 illustrates an example system 200 according to one or more embodiments.

FIG. 4 illustrates an example system 200 according to one or more embodiments. The system 200 may be a communication apparatus, such as a computer. For example, the system 200 may be a desktop computer, a tablet computer, a laptop computer, a phone, such as a smartphone, a server computer, or any other device that communicates via a network 265. The system 200 includes hardware, such as electronic circuitry. In one or more examples, the system 200 is the runtime data capture system 120.

The system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors, indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

In one or more examples, one or more components depicted in FIG. 1 are implemented as the system 200. For example, the workflow-access system 120, the workflow-target system 110, the one or more data sources 130, and/or any other components in the system 100 may be implemented by the system 200. The system 100 facilitates implementing the technical solutions described herein In one or more examples, a unique identifier for the workflow 125 and further a unique identifier for each workflow step in the workflow 125. The workflow 125 and the workflow steps, in one or more examples, can be further associated with descriptive names that are more human-usable. The descriptive names may not be unique. The matching of unique identifiers for the workflow 125 and the workflow steps is used, in one or more examples, to access appropriate information from the data sources 130. The information that the workflow executor 105 desires to get at is the additional information that is associated with the workflow 125 and each of the workflow steps that the community has created since the workflow 125 was created and provided by the vendor.

The workflow access system 120 finds the update information for the workflow steps and/or the workflow 125 using an access information for a specific data source 130 that is preconfigured with the workflow 125. Alternatively, or in addition, the access information is provided by the workflow executor 105. Alternatively, or in addition, the workflow access system 120 includes a preconfigured list of data sources with corresponding access information. Alternatively, or in addition, the workflow access system 120 discovers new data sources 130 for the workflow step, for example using a search engine, based on keywords associated with the workflow step and/or the unique identifier of the workflow step. For example, the workflow access system 120 performs a natural language parsing of the workflow step and generates a search query to be executed using a search engine or any other search system. The workflow access system 120 thus facilitates the workflow executor 105 to retrieve the latest information that is available for the workflow 125 and each of the workflow steps from the one or more data sources 130.

The data sources 130 include a domestic data store that is in the organization (for "domestic information") of the workflow executor 105. The domestic information includes information that is generated by one or more workflow executers from within the same organization as the workflow executor 105. The data sources 130 may further include a vendor's data store that may store information that is directly provided by the vendor of the workflow 125 ("vendor update information"). Further, the data sources 130 may include "open" data stores that are available via the Internet, and that are accessible (for "other user information"), for example via an application programming interface (API). In one or more examples, the workflow executor 105 specifies which data sources are to be used for a particular workflow 125 and/or for a particular workflow step, and indicates the kind of data that it would store or retrieve (domestic information, vendor update information etc.).

The workflow access system 120 requests, at certain points when the workflow executor 105 is executing the workflow 125, updates to the workflow 125 and a workflow step. In one or more examples, the workflow executor 105 has to indicate agreement to such an update. In response, the workflow access system 120 initiates communications with the appropriate one or more data sources 130 to retrieve the update information for the workflow 125 using the unique identifier(s). The retrieved update information is incorporated with the workflow 125 to revise the workflow 125 at runtime. In one or more examples, the incorporated updated information is identified by the data source 130 that the information is retrieved from.

In one or more examples, when execution of a workflow step is completed, the workflow access system 120 pushes, updated information back to the appropriate data sources 130. The updated information data is pushed corresponding to the right type of data generated. For instance, private data that is specific to the workflow executor's organization is sent to the data source 130 for the "domestic information". Further, updated information which is desired to be released in "other user information" is pushed to the other data sources 130. Further yet, information, which is desired to be sent back to the vendor is sent to the data source 130 associated with the workflow designer (ISV), for "vendor update information". In one or more examples, a data source 130 contains a list of the data sources 130 that are available to be used, where the workflow access system 120 performs a discovery on the data sources 130 from the list to identify specific types of data sources (domestic, vendor, other etc.).

Figure 5:
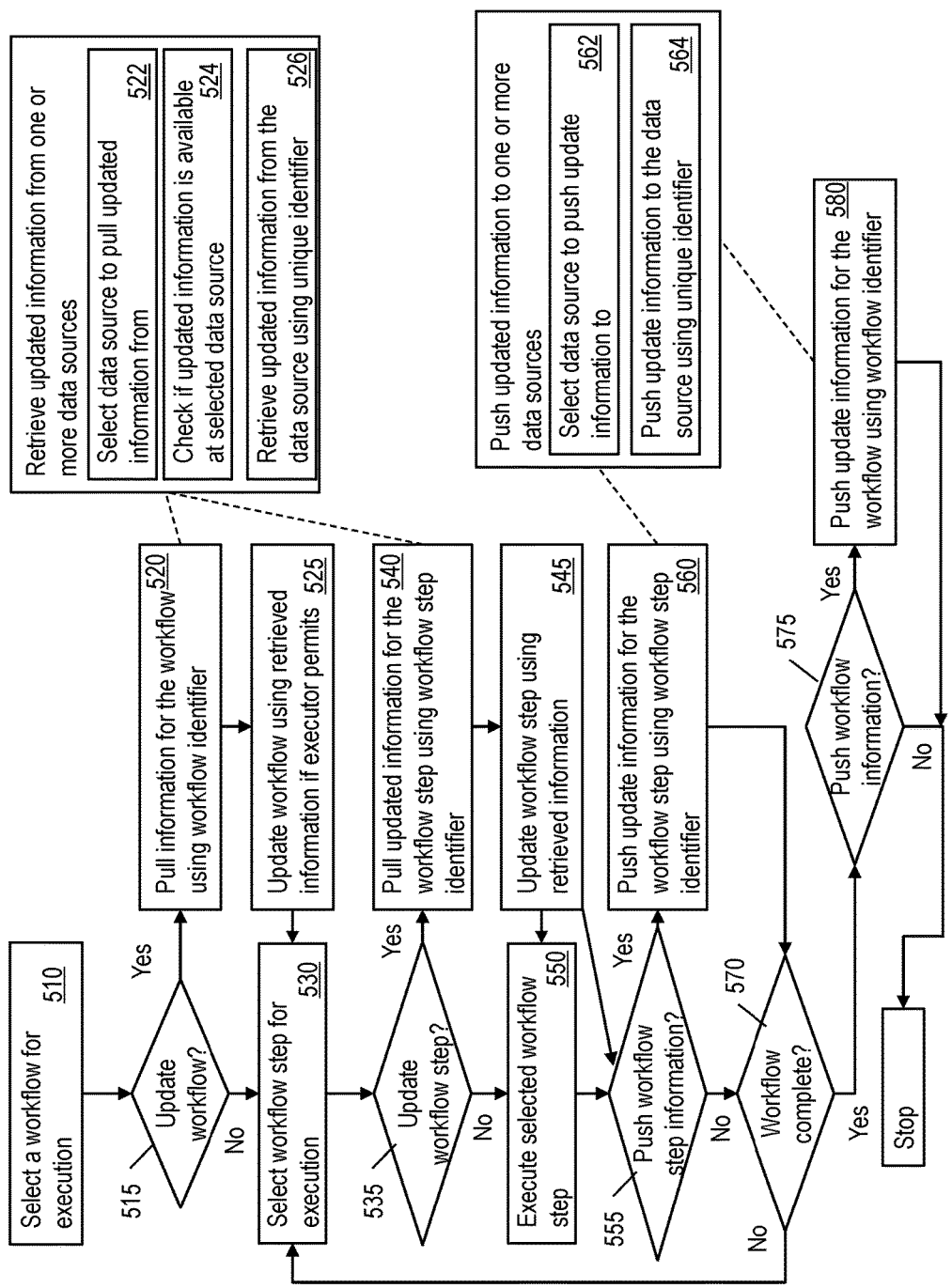
FIG. 5 depicts a flowchart of an example method for updating a workflow at runtime according to one or more embodiments.

FIG. 5 depicts a flowchart of an example method for updating a workflow at runtime according to one or more embodiments. The method may be implemented using the system 100. The method includes selecting the workflow 125 for execution by the workflow executor 105 via the workflow access system 120, as shown at 510. The selection, in one or more examples, is performed in response to receiving a notification for executing the workflow 125, or in response to receiving the workflow 125 itself. In one or more examples, the workflow 125 is selected from multiple workflows. The workflow is provided to the workflow executor 105 by the vendor or the workflow executor 105 can write his/her own.

In one or more examples, the workflow 125 includes one or more data sources 130 to use for various types of data (domestic, vendor update, other-user information). The data sources 130 may be identified in the workflow 125 by the vendor that created the workflow 125, and/or the workflow executor 105. Alternatively, or in addition, the workflow 125 may further indicate the workflow access system 120 to perform a discovery action, to search for data sources 130 to be used for finding updates and/or additional information about the workflow 125.

The method further includes checking with the workflow executor 105 whether to update the workflow 125, as shown at 515. If the workflow executor 105 initiates an update, the method includes pulling information for the workflow 125 from the one or more data sources, as shown at 520. The information includes update information and additional information for the workflow 125 that may facilitate the workflow executor 105 to determine whether to continue with execution of the workflow 125.

Pulling the information from the data sources 130 includes selecting a data source 130 and checking if updated information for the workflow 125 is available at the data source 130, as shown at 522 and 524. For example, the method includes detecting if the workflow 125 has been updated since receiving (or creating) the workflow 125 from the vendor. Alternatively, or in addition, the method includes detecting if other users or the vendor have added relevant information to the one or more data sources. The detecting includes checking the one or more data sources 130 using the unique identifier of the workflow 125. The data sources 130 maintain the updated information according to the unique identifier, for example indexed by the unique identifier.

The one or more data sources 130 may include a predetermined set of data sources 130 that are identified by the workflow 125. For example, the predetermined data sources 130 to be checked may include the vendor data source for an update that the vendor may have provided for the workflow 125 since the creation of the workflow 125. Any other data source, such as the domestic information data source, a social media data source, and the like may also be checked. The data sources 130 may be checked sequentially and/or in parallel. In one or more examples, the checking is performed in response to the workflow 125 is selected for execution, which may be later from when the workflow 125 is created and provided by the vendor.

If updated information is available, the method includes retrieving the updated information from the one or more data sources 130, as shown at 526. The updated information is incorporated with the workflow 125, as shown at 525. The workflow 125 is thus updated. For example, the incorporation may include adding and/or removing one or more workflow steps from the workflow 125. Alternatively, or in addition, the update may include revising one or more workflow steps from the workflow 125. For example, the revision may include a change in a parameter value used in the workflow steps, such as a pathname for a file, a filename, a numerical value to be used, a script to be executed, a script file to be used, a database query to be executed, an application programming interface call, a version number, or any other action specified by the workflow step.

The method further includes beginning to execute the workflow 125 by selecting a workflow step from the workflow 125, as shown at 530. The workflow step execution begins with or without the workflow update described earlier.

Prior to executing the workflow step, the method further includes determining if the workflow step is to be updated, as shown at 535. For example, the workflow step may have been updated in any of the data sources 130, since the earlier preliminary update (515). Alternatively, or in addition, data relevant to the execution of the workflow step can be available on the data sources 130. For example, the additional data may include information added in the vendor data source, domestic information data source, social media data source, or any other data source 130. The additional data indicates information that the workflow executor 105 can read and/or analyze to determine whether to proceed with the execution of the workflow step.

The workflow executor 105 is queried whether to pull such updated information for the workflow step, as shown at 535. In one or more examples, such a check is performed only if the workflow step is marked to check with the workflow executor 105 whether to initiate an update. If such a marking is not present, the workflow executor 105 is not queried for pulling the updated information.

If the workflow executor 105 initiates an update for the workflow step, the method includes pulling updated information for the workflow step from the one or more data sources 130, as shown at 540. Pulling the updated information includes selecting the data source 130 from the one or more predetermined data sources 130 associated with the workflow 125, as shown at 522. In one or more examples, the data sources 130 associated with the workflow step may be different than those associated with updating the workflow 125 at the outset of the method (515). Further, pulling the updated information includes checking if updated information for the workflow step is available in the selected data source, as shown at 524. In one or more examples, the updated information associated with the workflow step is identified using the workflow step identifier. In one or more examples, the data sources 130 maintain the updated information for the workflow steps based on the identifiers associated with the workflow steps, for example indexed according to the workflow step identifiers. In one or more examples, the workflow executor 105 executes the workflow step only if both conditions are met, the updated information being from a trusted data source and being recommended by the workflow vendor 107.

The updated information associated with the workflow step is retrieved, as shown at 526. The retrieved information is incorporated with the workflow step, as shown at 545. The updated information may include a revision to the workflow step. Alternatively, or in addition, the updated information may include data that the workflow executor 105 may read/analyze to determine whether to continue with the execution of the workflow step.

If the workflow executor 105 determines to continue execution, the method includes executing the workflow step, and thereby affecting a change in the workflow-target system 110, as shown at 550. The change may include a hardware configuration change and/or a software configuration change as described herein. Alternatively, the workflow executor 105 may determine to end workflow execution based on the updated information received from the one or more data sources 130, as shown at 570.

In one or more examples, regardless of whether the workflow step is executed or not, the workflow executor 105 may push updated information to the data sources 130, as shown at 555. For example, if the workflow executor 105 determines not to proceed with executing the workflow step, the workflow executor 105 may indicate as such in the data sources 130. In one or more examples, the data sources 130 may maintain a count of a number of times a workflow step has been executed, and such information being pushed by the workflow executor 105 facilitates maintaining the count. For example, the vendor data source may maintain such information. Alternatively, or in addition, any of the other data sources 130 may maintain such information. In addition, the workflow executor 105 may upload or push information leading to his/her decision to abort/proceed with the execution of the workflow step, such as security concerns, compatibility concerns, or any other reason why the workflow step was completed/not completed. Alternatively, or in addition, the workflow executor 105 may push information indicative of an ease of execution of the workflow step, such as a rating using a predetermined scale (such as a number of stars etc.). The information that is pushed is stored into the data sources 130 according to the identifier of the workflow step being executed.

As the workflow executor 105 performs the workflow step, s/he can add information about the workflow step, which is then sent to the data sources 130 when the workflow step is completed executing. For example, the workflow executor 105 may provide notes, tips, or even provide tools for performing the workflow step, such as a script that s/he developed for the workflow step. Alternatively, or in addition, the workflow executor 105 may provide a modified code (programming instructions) to be executed in place of code that is originally in the workflow step. Alternatively, or in addition, the workflow executor 105 may provide a pre-operation or a post-operation to be performed before or after executing the workflow step. Alternatively, or in addition, the workflow executor may describe side-effects of executing the workflow step on the workflow-target system 110. The above is a list of examples and in other examples, the workflow executor 105 may provide additional details regarding the execution of the workflow step.

If the workflow executor 105 determines to push the information about the workflow step to the data sources, the workflow access system 120 accumulates and pushes the information to the data sources, as shown at 560. Accumulating the data includes determining one or more parameters associated with the workflow-target system 110, such as the serial number, version number, specific configuration parameters (such as operating system, pathnames), and the like that provide contextual information regarding execution of the workflow step. Alternatively, or in addition, the accumulation includes collecting data associated with the workflow executor 105 such as username, employee id, organizational role, organizational permissions, and the like, to provide contextual information regarding the execution of the workflow step. Further yet, the accumulation includes collecting data associated with performing the execution, such as the duration of executing the workflow step, the time of day the execution was started and/or ended, the number of times the workflow step was updated from data sources 130, notes captured by the workflow executor 105, for example in a predetermined software application (such as ONENOTE™ etc.). In one or more examples, the accumulation further includes requesting the workflow executor 105 to rate the execution of the workflow step, such as on the basis of ease of execution, time of execution, results of workflow step meeting execution, and the like.

Pushing the accumulated information to the data sources 130 includes selecting one or more data sources 130 to push to, as shown at 562. The data sources 130 may be preselected by the workflow executor 105. Alternatively, or in addition, the workflow access system 120 selects the data sources 130 that is to be pushed based on the type of data being pushed. For example, if the data being pushed is a rating of the workflow step, the data may be pushed to the vendor data source 130. Alternatively, or in addition, if the workflow step was executed using settings specific to the environment to the workflow executor 105, the data may be pushed to the domestic data source 130. Further, the workflow executor 105 may be asked if the data is to be published outside the organization, such as to the vendor data source or the other user data sources like the social media data sources. If the data is being pushed out of the organization, in one or more examples, the workflow access system 120 parses the data and strips any organization specific information, such as filenames, usernames, passwords, pathnames, employee names, employee numbers, serial numbers, and the like, from the data being pushed. In one or more examples, such organization specific information is maintained or even added when pushing the data into the domestic information data source 130.

The workflow access system 120 pushes the data to the data sources 130 along with the workflow step unique identifier for easy search and identification of the data being associated with the workflow step, as shown at 564. In one or more examples, the data being pushed is further tagged with the workflow identifier.

Once the workflow step execution is completed, the method includes determining if the workflow execution is completed or if further workflow steps remain to be executed, as shown at 570. If additional workflow steps remain, the method iterates for the next workflow step until the entire workflow execution is completed. If the entire workflow execution is completed, the method includes checking with the workflow executor 105 if data associated with execution of the overall workflow is to be pushed to the data sources 130, as shown at 575. If the workflow executor 105 decides not to push any information, the method is completed.

If data is to be pushed to the data sources 130, the workflow access system 120 accumulates and pushes the data to be pushed to the one or more data sources 130, as shown at 580. Accumulating the data includes determining one or more parameters associated with the workflow-target system 110, such as the serial number, version number, specific configuration parameters (such as operating system, pathnames), and the like that provide contextual information regarding execution of the workflow 125. Alternatively, or in addition, the accumulation includes collecting data associated with the workflow executor 105 such as username, employee id, organizational role, organizational permissions, and the like, to provide contextual information regarding the execution of the workflow 125. Further yet, the accumulation includes collecting data associated with performing the execution, such as the duration of executing the workflow 125, the time of day the execution was started and/or ended, the number of times the workflow 125 was updated from data sources 130, notes captured by the workflow executor 105, for example in a predetermined software application (such as ONENOTE™ etc.). Further, the accumulation includes collecting the workflow specific information such as workflow version, vendor information, which of the workflow steps were executed and which were skipped, and the like. In one or more examples, the accumulation further includes requesting the workflow executor 105 to rate the execution of the workflow 125, such as on the basis of ease of execution, time of execution, results of workflow step meeting execution, and the like. The workflow access system 120 pushes the data to the data sources 130 along with the workflow unique identifier for easy search and identification of the data being associated with the workflow, as shown at 580.

Thus, the data sources 130 now store updated information for the workflow 125 and workflow steps that can be retrieved when asked for by a second workflow executor using the unique identifiers. The second workflow executor can thus make informed decisions when executing the workflow 125 using the information provided by the workflow executor 105. The details of the information stored vary based on what the workflow executor 105 selects to push and what has been found (e.g.: from social media sources, etc.).

Thus, the technical solutions described herein facilitate the workflow executor 105 to have the most updated version of a workflow step when executing a workflow. Further, the workflow executor 105 receives the most updated information about the workflow step from prior to initiating execution of the workflow step. Further, the technical solutions facilitate the workflow executor to update the data sources associated with the workflow step for next workflow executors to have the latest versions/data when executing the workflow step.

A technical challenge with receiving updated information from the data sources 130 and updating the workflow 125 includes that of ensuring computer security is maintained when modifying the workflow 125 and/or retrieving data from the data sources 130. The technical solutions described herein further address such technical challenges by providing security features to manage modifications of the workflow 125 and/or retrieving updated information that does not deteriorate the security of the workflow access system 120, and ensuring that said modifications and updated information are tracked as provided only by trusted data sources. According to one or more embodiments, the technical solutions described herein facilitate executing the machine-assisted workflow 125 with additional security precautions and enhancements for the workflow executor 105, when using the system 100.

For example, in his/her quest to have the latest information associated with the workflow 125, the workflow executor 105 may retrieve information from the one or more data sources 130 and increase the chance that the retrieved information may be inaccurate, for example, the information may not apply to the workflow executor 105, leading to incorrect results. Alternatively, or in addition, the retrieved data may be harmful to the workflow executor 105 when executing the workflow step using the retrieved data, for example, because of a virus, Trojan, malware, or other types of data security issues. The technical solutions described herein facilitate providing validation to the workflow executor 105 when retrieving and executing the workflow step based on the retrieved information. For example, such validation assures the workflow executor 105 that the step is not only necessary but also verified by the workflow vendor, or a member of a trusted user list as safe to execute. Alternatively, or in addition, the validation provides the workflow executor 105 an indication that the execution of the workflow step with the retrieved data enhances the security of the workflow target system 110 being run on upon completion of the workflow step.

In one or more examples, the vendor data source 130 provides one or more notifications to the workflow executor 105 when accessing updated information associated with the workflow 125 and/or a workflow step. The notifications indicate if the vendor update information is relevant to the security enhancing features of the workflow-target system 110. For example, the updated information is marked as recommended to the workflow executor 105. Accordingly, when the workflow executor 105 receives the updated information from the vendor data source 130, s/he is informed that the updated information is vendor recommended, and tested, thus facilitating the workflow executor to trust the updated information for retrieval and incorporation with the workflow 125.

Further, in one or more examples, as described herein, the workflow access system 120 may find updated information for the workflow 125 from data sources other than the vendor data source 130, based on the data sources that are provided by the workflow executor 105. For example, the workflow executor 105 may add the one or more other data sources, such as social media servers, blogs, forums, and other such data engines for discovering the latest updated information associated with the workflow. Such other data sources may be used by the workflow access system 120 to store and retrieve the latest updated information for the workflow 125 and the workflow steps. In one or more examples, the workflow vendor is provided the identity of such data sources, for example via the vendor data source 130. The vendor data source 130 compares the other data sources to a list of trusted data sources maintained by the vendor. The workflow access system 120, based on the vendor data source's list of trusted data sources, marks the available updated information from the other data sources as being trustworthy or not, thus facilitating the workflow executor to decide whether to retrieve and/or incorporate the available updated information with the workflow 125. The technical solutions described herein thus provide a trusted data mining engines list for analysis and security purposes. The technical solutions described herein, with the enhancements for security using the trusted data sources, facilitates the workflow executor 105 to determine whether to execute a workflow step by providing information about whether the workflow step that was just imported from an "other user" data source is accurate and safe to execute. Further, the technical solutions described herein facilitates the workflow executor 105 to determine whether the workflow step is recommended by the workflow vendor to be executed to make the workflow-target system 110 as secure as possible.

Figure 6:
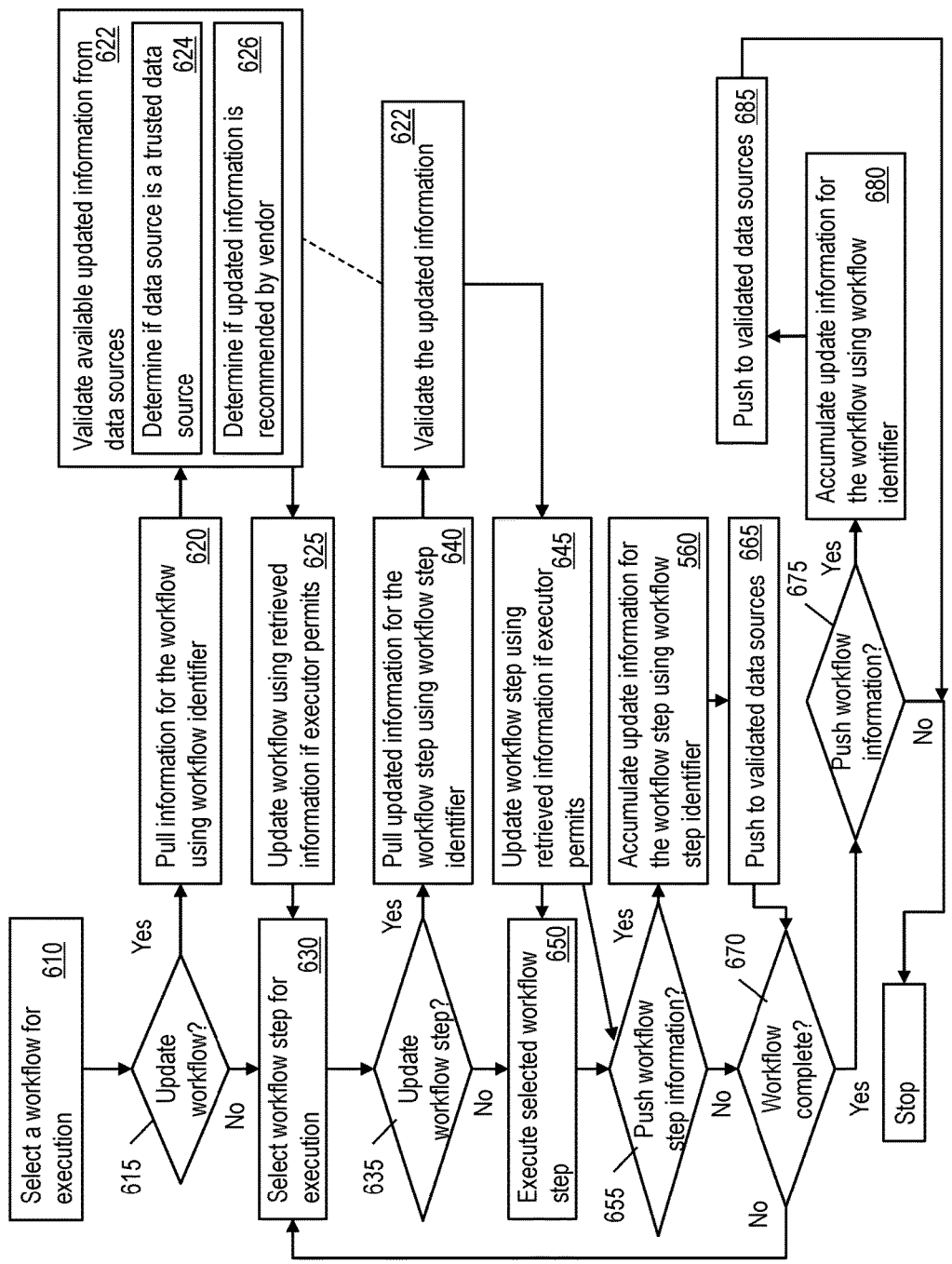
FIG. 6 depicts a flowchart of an example method for executing a workflow using cognitive learning with enhanced security according to one or more embodiments.

FIG. 6 depicts a flowchart of an example method for executing a workflow using cognitive learning with enhanced security according to one or more embodiments. The method may be implemented by the workflow execution system 100 described herein, or any other workflow execution. The method includes selecting the workflow 125 for execution by the workflow executor 105 via the workflow access system 120, as shown at 610. The selection, in one or more examples, is performed in response to receiving a notification for executing the workflow 125, or in response to receiving the workflow 125 itself. In one or more examples, the workflow 125 is selected from multiple workflows. The workflow is provided to the workflow executor 105 by the vendor or the workflow executor 105 can write his/her own.

In one or more examples, the workflow 125 includes one or more data sources 130 to use for various types of data (domestic, vendor update, other-user information). The data sources 130 may be identified in the workflow 125 by the vendor that created the workflow 125, and/or the workflow executor 105. Alternatively, or in addition, the data sources 130 may be identified in the workflow 125 by the workflow executor 105 that is executing the workflow 125. Alternatively, or in addition, the workflow 125 may further indicate the workflow access system 120 to perform a discovery action, to search for data sources 130 to be used for finding updates and/or additional information about the workflow 125.

The method further includes checking with the workflow executor 105 whether to update the workflow 125, as shown at 615. If the workflow executor 105 initiates an update, the method includes pulling information for the workflow 125 from the one or more data sources, as shown at 620. The information includes update information and additional information for the workflow 125 that may facilitate the workflow executor 105 to determine whether to continue with execution of the workflow 125. Pulling the updated information from the data sources includes the one or more operations described herein (see FIG. 5).

The method further includes validating the updated information available from the one or more data sources 130, as shown at 622. The validation includes determining if the data source from which the updated information is being retrieved is a trusted data source, as shown at 624. For example, the data source is considered as a trusted data source if the workflow executor 105 marks the data source as being trusted. Alternatively, or in addition, an identification of the data source, for example, an IP address, a server name, a certificate associated with the data source, or any other identification information of the data source is sent to the workflow vendor, for example via the vendor data source 130. In one or more examples, the workflow access system 120 sends the data source identification information, along with the workflow identifier to the workflow vendor. The workflow vendor verifies if the data source is a trusted data source with respect to the workflow 125 being executed. In one or more examples, the verification may include determining if the data source identification is part of a list of trusted data sources maintained by the workflow vendor, for example, as part of an authorized vendors or suppliers for the workflow 125. For example, trusted data sources may maintain a certificate of authentication that the workflow vendor creates and provides to only the trusted data sources. The certificate of authentication may use any authentication protocol currently available or later developed. It should be noted using a certificate of authentication to determine the validity of the data source is just one example, and that in one or more examples, additional or different forms of validation may be used to authenticate the data source(s).

Once the data source has been authenticated, either by the workflow executor 105, or by the workflow vendor 107, the validation further includes determining if the updated information is recommended by the workflow vendor 107 for the workflow 125, as shown at 626. In one or more examples, the workflow vendor 107 marks the updated information as recommended information for the workflow 125, for example using a recommendation flag associated with the data maintained by the data sources 130. If the updated information has not yet been analyzed by the workflow vendor 107, or if the updated information is not recommended by the workflow vendor 107, the recommendation flag is indicative of the not recommended status.

The method further includes receiving and analyzing the validation results by the workflow executor 105 and updating the workflow 125 using the updated information from the data source if the workflow executor 105 permits such an update, as shown at 625. For example, if the validation results indicate that the data source providing the updated information is not a trusted source, the workflow executor 105 may prevent incorporation of the updated information with the workflow 125, and continue with the existing workflow 125 without updates. Alternatively, the workflow executor 105 may permit the incorporation despite the data source not being a trusted source. Further, if the validation results indicate that the updated information does not contain a recommended update or recommended information about the workflow 125, the workflow executor 105 may prevent the incorporation with the workflow 125. Alternatively, despite the updated information not being a recommended update/data, the workflow executor 105 may continue with the incorporation and modification of the workflow 125.

The method further includes beginning to execute the workflow 125 by selecting a workflow step from the workflow 125, as shown at 630. The workflow step execution begins with or without the workflow update described earlier.

Prior to executing the workflow step, the method further includes determining if the workflow step is to be updated, as shown at 635. For example, the workflow step may have been updated in any of the data sources 130, since the earlier preliminary update (615). Alternatively, or in addition, data relevant to the execution of the workflow step can be available on the data sources 130. For example, the additional data may include information added in the vendor data source, domestic information data source, social media data source, or any other data source 130. The additional data indicates information that the workflow executor 105 can read and/or analyze to determine whether to proceed with the execution of the workflow step.

The workflow executor 105 is queried whether to pull such updated information for the workflow step, as shown at 635. In one or more examples, such a check is performed only if the workflow step is marked to check with the workflow executor 105 whether to initiate an update prior to execution. If such a marking is not present, the workflow executor 105 is not queried for pulling the updated information. If the workflow executor 105 initiates an update for the workflow step, the method includes pulling updated information for the workflow step from the one or more data sources 130, as shown at 640. Pulling the updated information for the workflow step includes one or more operations as described herein (See 515, for example).

Further, for enhanced security, the method includes, validating the updated information available from the one or more data sources 130, as described herein, and as shown at 622. Further, based on the validation results, the method includes updating the workflow step using the retrieved information if the executor permits, as shown at 645. For example, if the validation results indicate that the data source providing the updated information is not a trusted source, the workflow executor 105 may prevent incorporation of the updated information with the workflow step, and continue with the existing workflow step without updates. Alternatively, the workflow executor 105 may permit the incorporation despite the data source not being a trusted source. Further, if the validation results indicate that the updated information does not contain a recommended update or recommended information about the workflow step, the workflow executor 105 may prevent the incorporation with the workflow step. Alternatively, despite the updated information not being a recommended update/data, the workflow executor 105 may continue with the incorporation and modification of the workflow step. In one or more examples, the workflow executor 105 executes the workflow step only if both conditions are met, the updated information being from a trusted data source and being recommended by the workflow vendor 107.

If the workflow executor 105 determines to continue execution, the method includes executing the workflow step, and thereby affecting a change in the workflow-target system 110, as shown at 650. The change may include a hardware configuration change and/or a software configuration change as described herein. Alternatively, the workflow executor 105 may determine to end workflow execution based on the updated information received from the one or more data sources 130, as shown at 670.

In one or more examples, regardless of whether the workflow step is executed or not, the workflow executor 105 may push updated information to the data sources 130, as shown at 655. For example, if the workflow executor 105 determines not to proceed with executing the workflow step, the workflow executor 105 may indicate as such in the data sources 130. The workflow executor 105 may decide what information is to be pushed as described herein.

If the workflow executor 105 determines to push the information about the workflow step to the data sources, the workflow access system 120 accumulates the information to the data sources, as described herein, and as shown at 660. Pushing the accumulated information to the data sources 130 includes validating one or more data sources 130 to push to, as shown at 665. Validating the data source to which the data is to be pushed may be performed as described herein, and as shown in 622. The data source to which the data is pushed may be different from the data sources from which the data is being pulled, in one or more examples. For example, the data may be pulled from vendor data source, while the data is pushed only to the domestic information data source because of the presence of organization sensitive data.

The workflow access system 120 pushes the data to the data sources 130 along with the workflow step unique identifier for easy search and identification of the data being associated with the workflow step. In one or more examples, the data being pushed is further tagged with the workflow identifier.

Once the workflow step execution is completed, the method includes determining if the workflow execution is completed or if further workflow steps remain to be executed, as shown at 670. If additional workflow steps remain, the method iterates for the next workflow step until the entire workflow execution is completed. If the entire workflow execution is completed, the method includes checking with the workflow executor 105 if data associated with execution of the overall workflow is to be pushed to the data sources 130, as shown at 675. If the workflow executor 105 decides not to push any information, the method is completed.

If data is to be pushed to the data sources 130, the workflow access system 120 accumulates the data to be pushed to the one or more data sources 130, as described herein, and as shown at 680. Pushing the accumulated information to the data sources 130 includes validating one or more data sources 130 to push to, as shown at 685. Validating the data source to which the data is to be pushed may be performed as described herein, and as shown in 622. The data source to which the data is pushed may be different from the data sources from which the data is being pulled, in one or more examples. For example, the data may be pulled from vendor data source, while the data is pushed only to the domestic information data source because of the presence of organization sensitive data. The workflow access system 120 pushes the data to the data sources 130 along with the workflow unique identifier for easy search and identification of the data being associated with the workflow 125.

Thus, the data sources 130 now store updated information for the workflow 125 and workflow steps that can be retrieved when asked for by a second workflow executor using the unique identifiers. The second workflow executor can thus make informed decisions when executing the workflow 125 using the information provided by the workflow executor 105, retrieved from trusted data sources. The details of the information stored vary based on what the workflow executor 105 selects to push and what has been found (e.g.: from social media sources, etc.). Thus, the technical solutions described herein facilitate the workflow executor 105 to have the most updated version of a workflow step when executing a workflow, the updated version and associated information being retrieved from a trusted data source, and as recommended by the workflow vendor.

Further, a technical challenge with dynamic modification of the workflow 125 and the information associated with the workflow 125 is identifying vendor update information that is relevant to the reason for updating the workflow 125 and enabling the workflow executor 105 to make informed decisions whether to run the workflow 125, and further to enable the workflow access system 120 to automatically retrieve and store cognitive reasoning information about the workflow 125. For example, the workflow executor 105 may be considering updating and running a workflow step from the workflow 125. In one or more examples, the workflow executor 105 has to determine whether the updated information should be retrieved and/or if the workflow step is to be executed in his/her environment. For example, the update and/or execution of the workflow step may possibly either adversely affect the overall workflow 125 on the workflow-target system 110 or have no effect at all. This may be an even more substantial concern especially for workflow executors running enterprise software in environments such as banking, government, healthcare industries, and the like which are more data sensitive than some others.

The technical solutions described herein address such a technical challenge by providing machine-assisted reasoning, as a further enhancement to the workflow execution system 100. In one or more examples, the machine-assisted workflow 125 provides additional cognitive reasoning enhancements for the workflow executor 105 to determine whether to execute (or skip executing) the workflow 125 and/or any of the workflow steps. The reasoning/validation facilitates the workflow executor 105 an indication whether the workflow step is required or not required for the success of the overall workflow 125 in their environment, and further supplying the workflow executor 105 with one or more reasons why. In addition, the workflow 125, once updated according to the reasoning information, can be shared with the workflow vendor 107 so that other workflow executors of the same workflow 125 can determine whether or not to run the workflow step. Thus, a workflow executor reviewing the cognitive reasoning information has the latest updated information on the reasons why to run the workflow step in their environment.

The workflow access system 120, to provide the reasoning regarding whether to update the workflow step and/or execute the workflow step, identifies vendor update information that is relevant to the reason for updating and then executing the workflow step on the workflow-target system 110. In addition, the workflow access system 120 records such reasoning related data when the workflow executor 105 is executing the workflow step, such recorded data being provided to the next workflow executor who executes the workflow step to help the next workflow executor make an informed decision whether to actually execute the workflow step. Thus, the workflow executor 105, prior to deciding whether to modify or execute a workflow step, in addition to receiving the updates themselves, receives latest cognitive reasoning information available, so as to make an informed decision on whether to update and/or execute the next step on the workflow-target system 110. Further, the workflow executor 105 can further embellish the reasoning information by pushing his/her own reasoning related information into the data sources 130 after completion/skipping execution of the workflow step.

Figure 7:
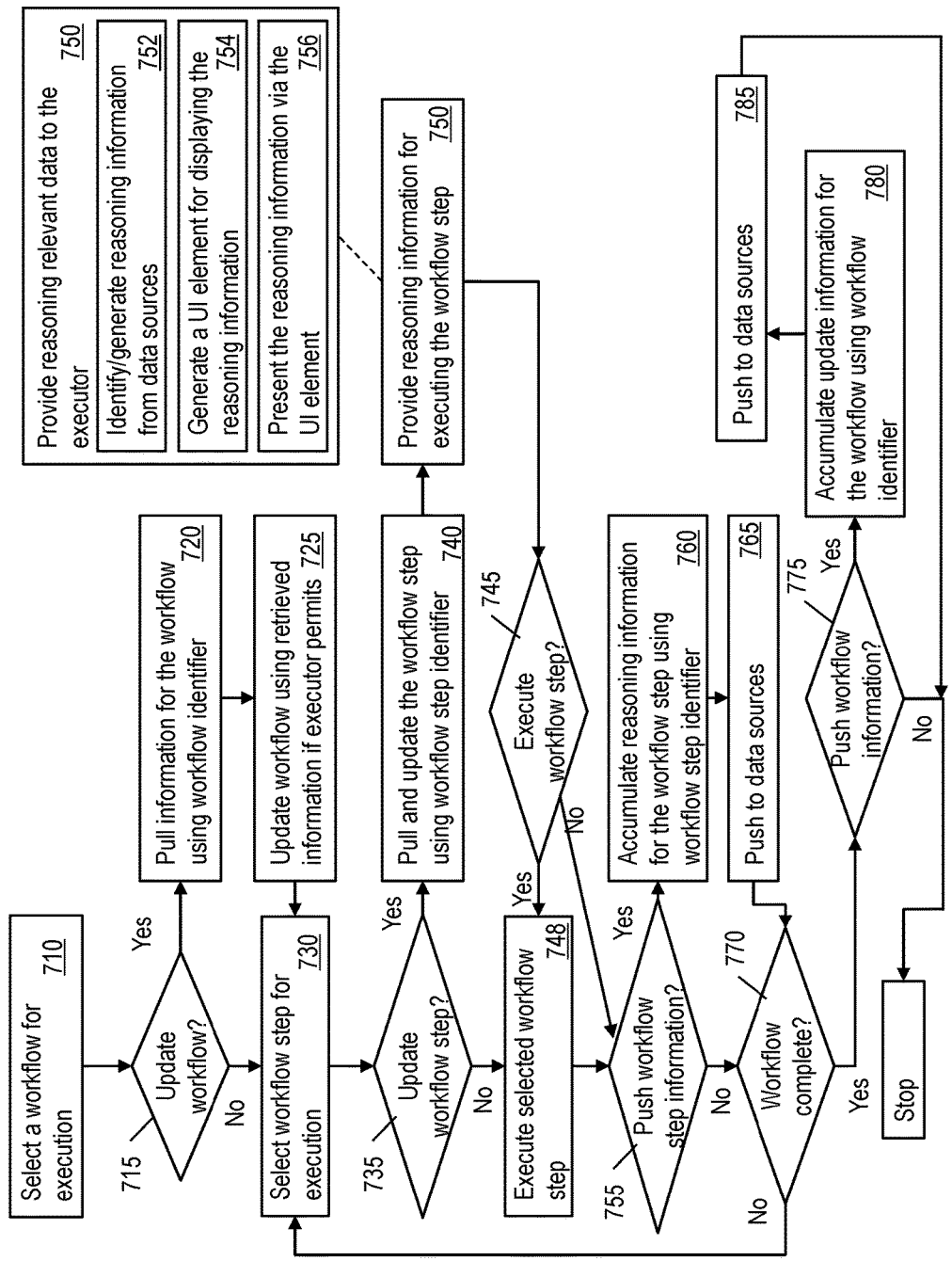
FIG. 7 depicts a flowchart of an example method for executing a workflow using cognitive learning providing cognitive reasoning according to one or more embodiments.

FIG. 7 depicts a flowchart of an example method for executing a workflow using cognitive learning providing cognitive reasoning according to one or more embodiments. The method may be implemented by the workflow execution system 100 described herein, or any other workflow execution. The method includes selecting the workflow 125 for execution by the workflow executor 105 via the workflow access system 120, as shown at 710. The selection, in one or more examples, is performed in response to receiving a notification for executing the workflow 125, or in response to receiving the workflow 125 itself. In one or more examples, the workflow 125 is selected from multiple workflows. The workflow is provided to the workflow executor 105 by the vendor or the workflow executor 105 can write his/her own.

The method further includes checking with the workflow executor 105 whether to update the workflow 125, as shown at 715. If the workflow executor 105 initiates an update, the method includes pulling information for the workflow 125 from the one or more data sources, as shown at 720. The information includes update information and additional information for the workflow 125 that may facilitate the workflow executor 105 to determine whether to continue with execution of the workflow 125. Pulling the updated information from the data sources includes the one or more operations described herein (see FIG. 5). The update may include validating the data sources (see FIG. 6). The workflow 125 is updated using the pulled updated information from the data sources 130, as described herein, and as shown at 725.

The method further includes beginning to execute the workflow 125 by selecting a workflow step from the workflow 125, as shown at 730. The workflow step execution begins with or without the workflow update described earlier. Prior to executing the workflow step, the method further includes determining if the workflow step is to be updated, as shown at 735. For example, the workflow step may have been updated in any of the data sources 130, since the earlier preliminary update (715). Alternatively, or in addition, data relevant to the execution of the workflow step can be available on the data sources 130. For example, the additional data may include information added in the vendor data source, domestic information data source, social media data source, or any other data source 130. The additional data indicates information that the workflow executor 105 can read and/or analyze to determine whether to proceed with the execution of the workflow step.

If the workflow executor 105 initiates an update for the workflow step, the method includes pulling and updating the workflow step from the one or more data sources 130, as shown at 740. Pulling the updated information for the workflow step and updating the workflow step includes one or more operations as described herein (See FIG. 5, for example). In one or more examples, data source validation may be performed, as described herein. Now that the workflow executor 105 knows that the workflow step has been updated, the workflow executor is provided reasoning information describing why s/he should run this particular workflow step in the workflow target-system 110, as shown at 750.

Providing the reasoning information includes identifying, from the one or more data sources 130, the cognitive reasoning information from the updated information associated with the workflow step, as shown at 752. In one or more examples, the reasoning information may be identified from a data source that is different from the data source from which an update for the workflow step is retrieved. In one or more examples, the reasoning information is identified based on the data source 130 including an identification tag indicating that the data is reasoning relevant data, and further the data being associated with the unique identifier of the workflow step. For example, the data may include a tag, such as 'execution reasoning' to facilitate the workflow access system 120 to efficiently determine data that is relevant to reasoning. Further yet, the reasoning information may be identified by syntactically and semantically parsing the data from the data source 130. For example, the workflow access system 120 may use machine learning algorithms, such as artificial neural networks, and the like to determine fragments of the updated information from the data sources 130 that provides reasoning related information. In one or more examples, the workflow access system 120 may use an API such as IBM WATSON® or any other such services, for determining the reasoning related information from the updated information available on the data sources 130 for the workflow step.

Further, providing the reasoning information includes generating a user-interface (UI) element, by the workflow-access system 120 and displaying the one or more fragments of reasoning-related information from the data sources 130, as shown at 754. In one or more examples, the UI element is generated on a side of the workflow steps being presented to the workflow executor 105. Alternatively, or in addition, the UI element is generated in any other manner, such as, as a pop-up window, an overlay window, and the like. In one or more examples, the UI element includes an indication whether execution of the workflow is recommended by the workflow vendor 107. Further, in one or more examples, the reasoning information that is provided to the workflow executor 105 is filtered so that only the reasoning information provided by other workflow executors using substantially same workflow-target system environment, for example, version, operating system, etc., as the workflow executor 105.

The reasoning information may also include reasons as to why the workflow executor 105 may want to skip executing the workflow step. For example, the reasoning information may include information indicating technical issues faced by other workflow executors after executing the workflow step.

Further yet, the reasoning information may include reasons based on temporal information. For example, the workflow access system 120 determines that the average time to execute the workflow step is X minutes, rendering the workflow-target system 110 unusable during that time. Executing the workflow step at present may cause the workflow-target system 110 to be unusable during a high-traffic time, when multiple users are using the workflow-target system 110. The workflow access system 120 determines the high-traffic time for the workflow-target system 110 based on historical execution data of the workflow-target system 110. Accordingly, the workflow-access system 120 provides reasoning information to the workflow executor 105 to execute the workflow step at a later time with recommended times with minimum overlap with high traffic times.

Providing the reasoning information to the workflow executor 105 further includes presenting the information via the UI element, as shown at 756. Based on the reasoning information, the workflow executor 105 may or may not execute the workflow step, as shown at 745. The workflow executor may execute the workflow step and thereby effect a change in the workflow-target system 110, as shown at 748. The change may include a hardware configuration change and/or a software configuration change as described herein. Alternatively, the workflow executor 105 may determine to skip the workflow step based on the reasoning information, as shown at 745.

In one or more examples, regardless of whether the workflow step is executed or not, the workflow executor 105 may push updated information to the data sources 130, as shown at 755. For example, if the workflow executor 105 determines not to proceed with executing the workflow step, the workflow executor 105 may indicate as such in the data sources 130. The workflow executor 105 may decide what information is to be pushed as described herein.

If the workflow executor 105 determines to push the information about the workflow step to the data sources, the workflow access system 120 accumulates the information to be pushed to the data sources 130, as described herein, and as shown at 760. The accumulated information further includes, from the workflow executor 105 his/her reasoning why the execution is skipped/performed, for example, citing un/availability of one or more resources required by the workflow step execution, such as an amount of memory consumption, amount of downtime, bandwidth requirements, or any other resources or a combination thereof. Alternatively, or in addition, the reasoning information may include difficulty/ease of execution of the workflow, such as the description of the workflow being easy/complicated, shorter/longer than a predetermined number of steps, the rating of the workflow step being below/above a predetermined threshold, or the like.

In one or more examples, the workflow access system 120 tags the reasoning information provided by the workflow executor 105 using the predetermined reasoning tag. Further, the workflow access system 120 pushes the information to the one or more data sources 130 along with the workflow step unique identifier, as shown at 765. Pushing the accumulated information to the data sources 130 includes validating one or more data sources 130 to push to, in one or more examples. In one or more examples, the data being pushed is further tagged with the workflow identifier.

Once the workflow step execution is completed, the method includes determining if the workflow execution is completed or if further workflow steps remain to be executed, as shown at 770. If additional workflow steps remain, the method iterates for the next workflow step until the entire workflow execution is completed. If the entire workflow execution is completed, the method includes checking with the workflow executor 105 if data associated with execution of the overall workflow is to be pushed to the data sources 130, as shown at 775. If the workflow executor 105 decides not to push any information, the method is completed.

If data is to be pushed to the data sources 130, the workflow access system 120 accumulates the data to be pushed to the one or more data sources 130, as described herein, and as shown at 780. The accumulated information may include reasoning information for the overall workflow 125. The workflow access system 120 further pushes the accumulated information to the data sources 130, as shown at 785. The workflow access system 120 pushes the data to the data sources 130 along with the workflow unique identifier for easy search and identification of the data being associated with the workflow 125.

Thus, the data sources 130 now store updated reasoning information for the workflow 125 and workflow steps that can be retrieved when asked for by a second workflow executor using the unique identifiers. The second workflow executor can thus make informed decisions when executing the workflow 125 using the information provided by the workflow executor 105, retrieved from the data sources 130. Thus, the technical solutions described herein facilitate the workflow executor 105 to have the most updated version of a workflow step when executing a workflow, the updated version and associated information being retrieved from a trusted data source, and further reasoning information facilitating the workflow executor 105 to decide whether to execute the workflow step.

Further yet, a technical challenge with executing machine-assisted workflows, such as the workflow 125, is that the workflow executor 105, who is considering updating and then running a workflow step does not know if s/he has the information and/or parameters setup for completing execution of the workflow step. Further, the workflow executor 105 does not know whether executing the workflow step will adversely affect the overall workflow on the workflow-target system 110, or if the workflow results will have no effect at all, rendering time and efforts of executing the workflow in vain, particularly if the workflow step and/or workflow involves significant downtime of the workflow-target system 110. This is a substantial concern for workflow executors, especially those running enterprise software in environments such as the banking, government, healthcare, and the like, where avoiding system downtime is critical.

For example, the workflow executor 105 desires to have the latest-and-greatest information before executing a step, and the workflow execution system 100 described herein facilitates the workflow executor 105 to have the latest additional information that has accumulated in the data sources 130 until the workflow executor 105 initiates execution of a workflow step. However, using such latest information may increase the chance that it might not apply to the workflow executor 105, or may be unnecessary or harmful to the workflow executor 105.

The technical solutions described herein address such technical challenge by enhancing the workflow execution system 100 to provide a post-step browse capability or preview function that is available to the workflow executor 105 to determine whether and how the updated information affects their workflow-target system 110 in any way. In addition, the workflow preview, and actual results after the workflow step is executed can be shared with the workflow vendor 107 as well as other users of the same workflow 125 to help the other users decide whether or not to run the workflow step. A user reviewing such cognitive preview information thus has the latest updated information on whether or not to run the workflow step in their environment and can contribute and improve the step preview for others.

In one or more examples, a vendor update information that provides a workflow step preview of execution on the workflow-target system 110 is identified and recorded by the workflow-access system 120. Such preview information is provided to the workflow executor 105 executing the workflow, thus supplying the updated information to help the workflow executor 105 make an informed decision whether to actually execute the workflow step on the workflow-target system 110. In one or more examples, the workflow access system 120 monitors the updated information being pushed to the one or more data sources 130 for identifying preview information.

The preview information may include information such as resources required to execute the workflow step, for example, amount of time, communication bandwidth, amount of memory, amount of storage disk space, number of people, one or more specific files, one or more specific tools (screwdrivers, etc.), one or more specific hardware components, and the like. Further, the preview information may include information such as parameter settings to be made prior to or during execution of the workflow step, for example, registry settings, account permission settings, and the like. The preview information may be in the form of electronic text, or images, for example, screenshots of one or more tasks being performed from the workflow step. In one or more examples, the preview information includes a set of screenshots (or images) depicting each operation of the workflow step being performed. The workflow access system 120 captures the screenshots as the workflow step is being executed, and pushes the captured screenshots to the data sources 130 after completion of the workflow step execution. The captured screenshots are marked as the preview information along with the unique identifiers of the workflow step and the workflow 125 for efficient access.

Alternatively, or in addition, the workflow access system 120 generates a virtual simulation of the workflow step execution. In one or more examples, the workflow access system 120 executes a virtual machine replica of the workflow-target system 120, using the one or more parameters from the updated information that is retrieved from the data sources. The workflow executor 105 can preview the results of the workflow step in the virtual machine, and based on the preview decide whether to execute the workflow step in the workflow-target system 110. The technical solutions thus facilitate previewing the execution of the one or more workflow steps from the workflow 125, using the updated information, thus facilitating the workflow executor 105 to determine whether to proceed with actual execution of the workflow step.

Figure 8:
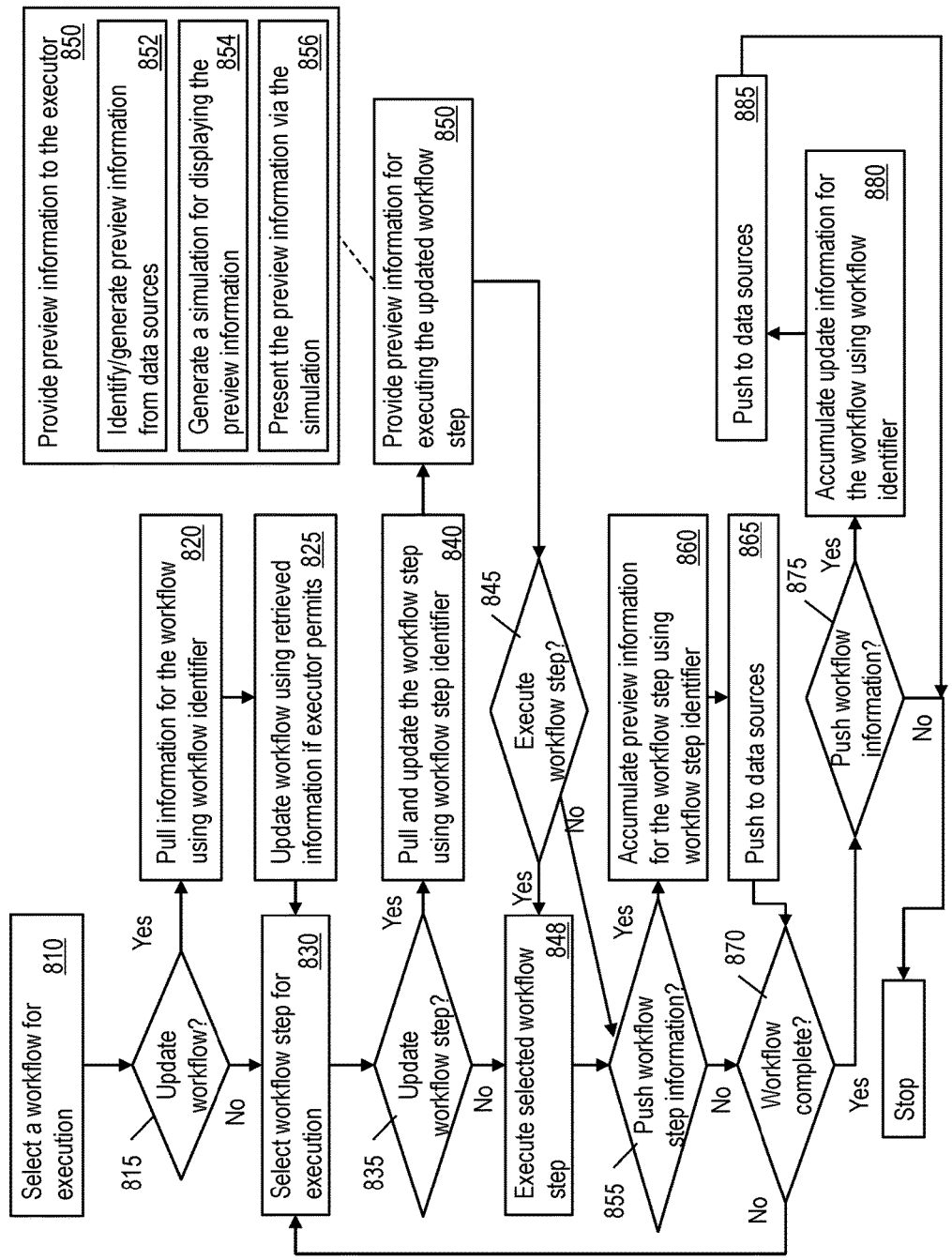
FIG. 8 depicts a flowchart of an example method for executing a workflow using cognitive learning with workflow step preview according to one or more embodiments.

FIG. 8 depicts a flowchart of an example method for executing a workflow using cognitive learning with workflow step preview according to one or more embodiments. The method may be implemented by the workflow execution system 100 described herein, or any other workflow execution. The method includes selecting the workflow 125 for execution by the workflow executor 105 via the workflow access system 120, as shown at 810. The selection, in one or more examples, is performed in response to receiving a notification for executing the workflow 125, or in response to receiving the workflow 125 itself. In one or more examples, the workflow 125 is selected from multiple workflows. The workflow is provided to the workflow executor 105 by the vendor or the workflow executor 105 can write his/her own.

The method further includes checking with the workflow executor 105 whether to update the workflow 125, as shown at 815. If the workflow executor 105 initiates an update, the method includes pulling information for the workflow 125 from the one or more data sources, as shown at 820. The information includes update information and additional information for the workflow 125 that may facilitate the workflow executor 105 to determine whether to continue with execution of the workflow 125. Pulling the updated information from the data sources includes the one or more operations described herein (see FIG. 5). The update may include validating the data sources (see FIG. 6). The workflow 125 is updated using the pulled updated information from the data sources 130, as described herein, and as shown at 825.

The method further includes beginning to execute the workflow 125 by selecting a workflow step from the workflow 125, as shown at 830. The workflow step execution begins with or without the workflow update described earlier. Prior to executing the workflow step, the method further includes determining if the workflow step is to be updated, as shown at 835. For example, the workflow step may have been updated in any of the data sources 130, since the earlier preliminary update (815). Alternatively, or in addition, data relevant to the execution of the workflow step can be available on the data sources 130. For example, the additional data may include information added in the vendor data source, domestic information data source, social media data source, or any other data source 130. The additional data indicates information that the workflow executor 105 can read and/or analyze to determine whether to proceed with the execution of the workflow step.

If the workflow executor 105 initiates an update for the workflow step, the method includes pulling and updating the workflow step from the one or more data sources 130, as shown at 840. Pulling the updated information for the workflow step and updating the workflow step includes one or more operations as described herein (See FIG. 5, for example). In one or more examples, data source validation may be performed, as described herein. Now that the workflow executor 105 knows that the workflow step has been updated, the workflow executor is provided preview information for executing this particular updated workflow step in the workflow target-system 110, as shown at 850.

Providing the preview information includes identifying, from the one or more data sources 130, the preview information from the updated information associated with the workflow step, as shown at 852. In one or more examples, the preview information may be identified from a data source that is different from the data source from which an update for the workflow step is retrieved. In one or more examples, the preview information is identified based on the data source 130 including an identification tag indicating that the data is preview relevant data, and further the data being associated with the unique identifier of the workflow step. For example, the data may include a tag, such as 'execution preview' to facilitate the workflow access system 120 to efficiently determine data that is relevant to preview of executing the workflow step. Further yet, the preview information may be identified by syntactically and semantically parsing the data from the data source 130. For example, the workflow access system 120 may use machine learning algorithms, such as artificial neural networks, and the like to determine fragments of the updated information from the data sources 130 that provide preview related information. In one or more examples, the workflow access system 120 may use an API such as IBM WATSON® or any other such services, for determining the preview related information from the updated information available on the data sources 130 for the workflow step.

Further, providing the reasoning information includes generating a simulation of the workflow-target system 110, by the workflow-access system 120 and displaying a preview of execution of the workflow step using the data from the identified preview information from the data sources, as shown at 854. In one or more examples, the simulation may include executing a virtual machine with a replica of the workflow-target system 11. Alternatively, or in addition, the simulation may include a series of screenshots, the series composed from one or more screenshots received from the preview information. Alternatively, or in addition, the simulation may include one or more images generated by modifying predetermined screenshots based on the preview information. For example, the workflow access system 120 may include a template screenshot of the workflow-target system 110 that includes such as 'storage space required for this workflow step: XXXX', where the XXXX is replaced with a result value from the preview information. In one or more examples, the simulation may be text-based and not image-based, where the templates are text-based, or a combination of both.

In one or more examples, the simulation is presented to the workflow executor 105, as shown at 856. The presentation may include user interface elements that facilitate the workflow executor 105 to move forward (and backward) through one or more subtasks of the workflow step to preview the one or more requirements of the workflow step as well as intermediate results of the workflow step being executed according to the updated information. Alternatively, or in addition, the presentation of the preview information may include presenting a series of images or text.

Based on the preview information, the workflow executor 105 may or may not execute the workflow step, as shown at 845. The workflow executor may execute the workflow step and thereby effect a change in the workflow-target system 110, as shown at 848. The change may include a hardware configuration change and/or a software configuration change as described herein. Alternatively, the workflow executor 105 may determine to skip the workflow step based on the preview information, as shown at 845.

In one or more examples, regardless of whether the workflow step is executed or not, the workflow executor 105 may push updated information to the data sources 130, as shown at 855. For example, if the workflow executor 105 determines not to proceed with executing the workflow step, the workflow executor 105 may indicate as such in the data sources 130. The workflow executor 105 may decide what information is to be pushed as described herein.

If the workflow executor 105 determines to push the information about the workflow step to the data sources, the workflow access system 120 accumulates the information to be pushed to the data sources, as described herein, and as shown at 860. The accumulated information further includes, from the workflow executor 105 his/her screenshots and parameters values when executing the workflow step. In one or more examples, the workflow access system 120 monitors and captures the preview information as the workflow executor 105 is executing the workflow step, and upon the workflow executor 105 instructing to push the preview information, uploading the captured preview information to the one or more data sources 130. For example, the workflow access system 120 captures the screenshots as the workflow step is being executed, and pushes the captured screenshots to the data sources 130 after completion of the workflow step execution. The captured screenshots are marked as the preview information along with the unique identifiers of the workflow step and the workflow 125 for efficient access. In one or more examples, the workflow access system 120 scrubs the preview information of sensitive data before uploading the preview information to data sources 130 outside of the workflow executor's organization.

In one or more examples, the workflow access system 120 tags the preview information provided by the workflow executor 105 using the predetermined preview tag. Further, the workflow access system 120 pushes the preview information to the one or more data sources 130 along with the workflow step unique identifier, as shown at 865. Pushing the accumulated information to the data sources 130 includes validating one or more data sources 130 to push to, in one or more examples. In one or more examples, the data being pushed is further tagged with the workflow identifier.

Once the workflow step execution is completed, the method includes determining if the workflow execution is completed or if further workflow steps remain to be executed, as shown at 870. If additional workflow steps remain, the method iterates for the next workflow step until the entire workflow execution is completed. If the entire workflow execution is completed, the method includes checking with the workflow executor 105 if data associated with execution of the overall workflow is to be pushed to the data sources 130, as shown at 875. If the workflow executor 105 decides not to push any information, the method is completed.

If data is to be pushed to the data sources 130, the workflow access system 120 accumulates the data to be pushed to the one or more data sources 130, as described herein, and as shown at 880. The accumulated information may include preview information for the overall workflow 125. For example, the preview information may include a subset of the preview information for each of the workflow steps or a collection of all of the preview information for each of the workflow steps. The workflow access system 120 further pushes the accumulated information to the data sources 130, as shown at 885. The workflow access system 120 pushes the data to the data sources 130 along with the workflow unique identifier for easy search and identification of the data being associated with the workflow 125.

Thus, the data sources 130 now store updated preview information for the workflow 125 and workflow steps that can be retrieved when asked for by a second workflow executor using the unique identifiers. The second workflow executor can thus make informed decisions when executing the workflow 125 using the preview information provided by the workflow executor 105, retrieved from the data sources 130. Thus, the technical solutions described herein facilitate the workflow executor 105 to have the most updated version of a workflow step when executing a workflow, the updated version and associated information being retrieved from a trusted data source, and further preview information facilitating the workflow executor 105 to decide whether to execute the workflow step.

Yet another technical challenge with the machine-assisted workflow execution is that the workflow executor 105, prior to executing a workflow step, is not entirely certain that the updated information and/or the updated workflow step will execute successfully in his/her workflow-target system environment. This is a significant concern when retrieving updates and/or other information from non-vendor sources. Further, this can be a substantial concern especially when executing workflows with workflow-target systems being enterprise systems in environments such as banking, government, and healthcare and other such industries where downtime caused by such workflow execution may be life-threatening or substantially costly.

For example, if the workflow executor 105 desiring to have the latest information about the workflow step before executing the workflow step, updates the workflow step using the information that is continuously accumulating in the marketplace, the chance that the updated workflow step might not work for the workflow executor's 105 environment increases, especially with updates received from non-vendor sources (but trusted data sources). Thus, a technical challenge exists to provide a step test result or historical information from other users executing the workflow step to the workflow executor 105 that is running the workflow step to assure the workflow executor 105 that the execution of the workflow step is not harmful to the workflow-target system 110. Further, a technical challenge exists for the workflow 125, once it has been executed (successfully or unsuccessfully) by the workflow executor 105, to be embellished with execution information from the workflow executor 105. The embellishment may include step-result information to be shared with the workflow vendor, and/or other users of the workflow 125 to help the other users running the workflow step ahead of time. The shared information can include any information about harmful problems or errors (for example, restrictive security updates) that were a result of executing the workflow step after the update.

The technical challenges are addressed by the system 100 by facilitating the workflow executor 105 to receive step-result information from execution of the workflow step from other executors. Thus, the result information that is based on the latest information helps increase the probability of success of running the workflow step in the target-workflow system environment for the workflow executor 105. The system 100 further facilitates the user to contribute to and improve the same workflow step result information for other users.

In one or more examples, vendor update information that is relevant to the workflow step results and execution of the workflow step on the workflow-target system 110 is recorded and recommended to the workflow executor 105. The recommendation includes supplying information that facilitates the workflow executor to make an informed decision whether the workflow steps can run successfully or not in the environment that the workflow executor 105 uses.

The workflow access system 120 finds the update information that is relevant to the workflow steps from the one or more data sources 130 because the workflow access system 120 is provided access information of the data sources, or by performing a discovery of new data sources 130, such as using a search engine.

The data sources 130 store and provide the workflow-access system 110. For example, the workflow access system 120 retrieves the latest cognitive workflow step result information that has been stored for workflow 125 and/or the workflow steps from the one or more data sources 130. The step result information includes, for example, an assurance rating that the workflow step is valid, number of successful step executions in the environment, and the like. The workflow access system 120 requests updates to the workflow 125 and/or a specific workflow step at certain time points during execution of the workflow 125. In one or more examples, the workflow 125 and/or the workflow steps indicate that an update is to be sought prior to execution. Responsively, the workflow access system 120 initiates communications with the appropriate data sources 130 using the unique identifier(s).

Thus, in addition to workflow updates themselves, the workflow executor 105 feels comfortable having all possible cognitive step test result information available, to make an informed decision on whether to run the workflow step on the workflow-target system 110 based on the cognitive result-information of the step's past test results. Further, once the workflow step is completed, the workflow access system 120, in one or more examples, pushes, with the user's agreement, new workflow step result information to the one or more data sources 130 based on the execution by the workflow executor 105. In one or more examples, appropriate portions of the results are pushed to the corresponding data sources based on the type of result data. For instance, a data source 130 within the workflow executor's 105 own organization is pushed to the "domestic information."

Figure 9:
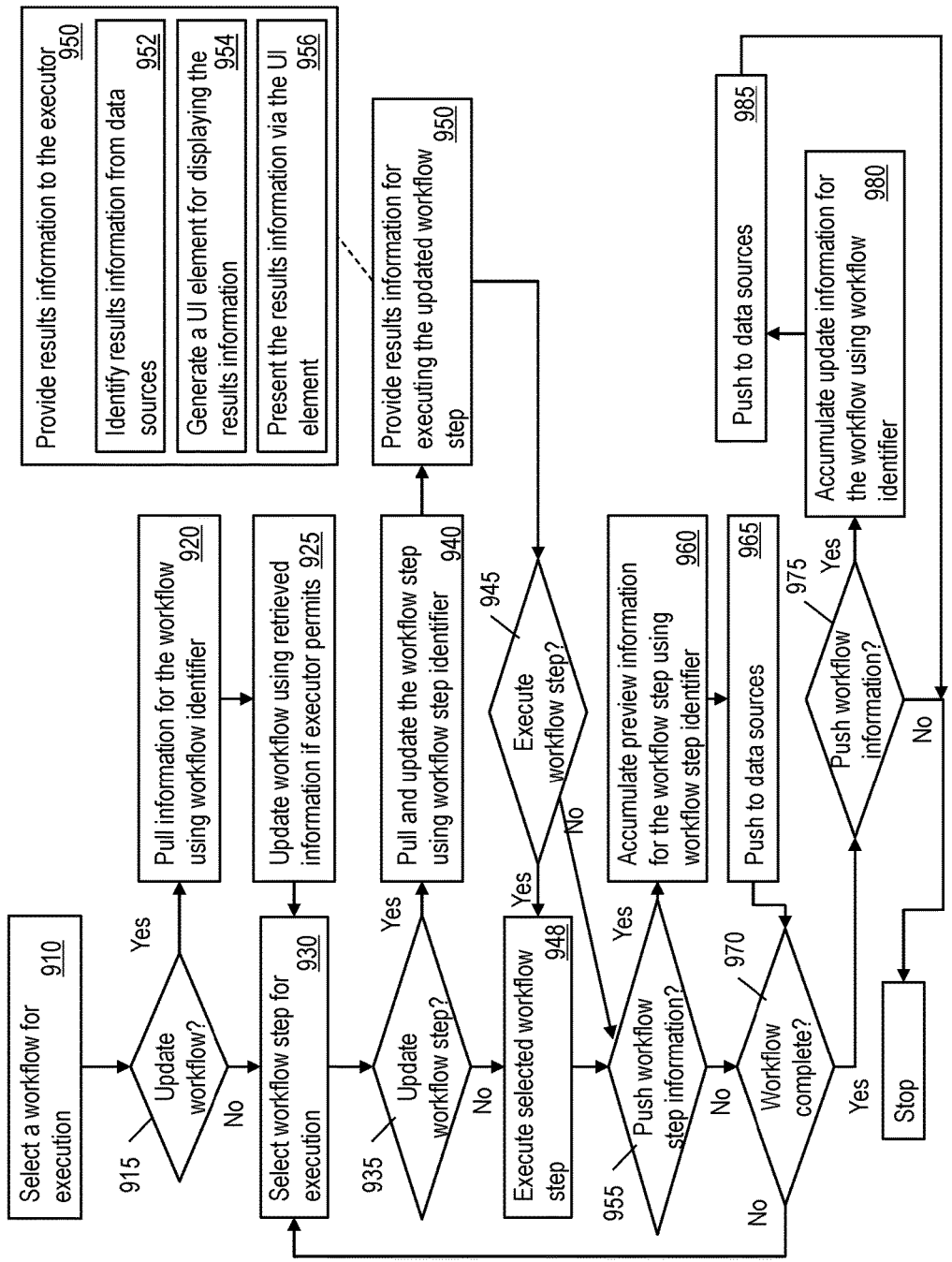
FIG. 9 illustrates a flowchart of an example method for executing a workflow using cognitive learning with workflow step results information according to one or more embodiments of the present invention.

FIG. 9 illustrates a flowchart of an example method for executing a workflow using cognitive learning with workflow step results information according to one or more embodiments of the present invention. The method may be implemented by the workflow execution system 100 described herein, or any other workflow execution. The method includes selecting the workflow 125 for execution by the workflow executor 105 via the workflow access system 120, as shown at 910. The selection, in one or more examples, is performed in response to receiving a notification for executing the workflow 125, or in response to receiving the workflow 125 itself. In one or more examples, the workflow 125 is selected from multiple workflows. The workflow is provided to the workflow executor 105 by the vendor or the workflow executor 105 can write his/her own.

The method further includes checking with the workflow executor 105 whether to update the workflow 125, as shown at 915. If the workflow executor 105 initiates an update, the method includes pulling information for the workflow 125 from the one or more data sources, as shown at 920. The information includes update information and additional information for the workflow 125 that may facilitate the workflow executor 105 to determine whether to continue with execution of the workflow 125. Pulling the updated information from the data sources includes the one or more operations described herein (see FIG. 5). The update may include validating the data sources (see FIG. 6). The workflow 125 is updated using the pulled updated information from the data sources 130, as described herein, and as shown at 925.

The method further includes beginning to execute the workflow 125 by selecting a workflow step from the workflow 125, as shown at 930. The workflow step execution begins with or without the workflow update described earlier. Prior to executing the workflow step, the method further includes determining if the workflow step is to be updated, as shown at 935. For example, the workflow step may have been updated in any of the data sources 130, since the earlier preliminary update (915). Alternatively, or in addition, data relevant to the execution of the workflow step can be available on the data sources 130. For example, the additional data may include information added in the vendor data source, domestic information data source, social media data source, or any other data source 130. The additional data indicates information that the workflow executor 105 can read and/or analyze to determine whether to proceed with the execution of the workflow step.

If the workflow executor 105 initiates an update for the workflow step, the method includes pulling and updating the workflow step from the one or more data sources 130, as shown at 940. Pulling the updated information for the workflow step and updating the workflow step includes one or more operations as described herein (See FIG. 5, for example). In one or more examples, data source validation may be performed, as described herein. Now that the workflow executor 105 knows that the workflow step has been updated, the workflow executor is provided steps results information of executing this particular updated workflow step in the workflow target-system 110, as shown at 950.

Providing the results information includes identifying, from the one or more data sources 130, the results information from the updated information associated with the workflow step, as shown at 952. In one or more examples, the results information may be identified from a data source that is different from the data source from which an update for the workflow step is retrieved. In one or more examples, the results information is identified based on the data source 130 including an identification tag indicating that the data is results relevant data, and further the data being associated with the unique identifier of the workflow step. For example, the data may include a tag, such as 'execution results' to facilitate the workflow access system 120 to efficiently determine data that is relevant to results of executing the workflow step. Further yet, the results information may be identified by syntactically and semantically parsing the data from the data source 130. For example, the workflow access system 120 may use machine learning algorithms, such as artificial neural networks, and the like to determine fragments of the updated information from the data sources 130 that provide results related information. In one or more examples, the workflow access system 120 may use an API such as IBM WATSON® or any other such services, for determining the results related information from the updated information available on the data sources 130 for the workflow step.

Further, the workflow access system, based on the available results relevant information from the data sources, generates the results information for the workflow. For example, the results information may include a number of times the workflow step has been executed by other users, number of times the workflow step has been skipped, number of times an error caused by the workflow step has been reported, number of times the workflow step has not completed execution after initiation, and other such information regarding execution of the workflow steps. Alternatively, or in addition, the results information may include ratings provided by the other users related to the execution of the workflow step, such as ease of execution, time required for execution, resources required for execution, overall rating for the workflow step, and the like.

Further, providing the results information includes generating a user-interface (UI) element, by the workflow-access system 120 for displaying the results information generated based on the results—related information from the data sources 130, as shown at 954. In one or more examples, the UI element is generated on a side of the workflow steps being presented to the workflow executor 105. Alternatively, or in addition, the UI element is generated in any other manner, such as, as a pop-up window, an overlay window, and the like. In one or more examples, the UI element includes an indication whether execution of the workflow is recommended by the workflow vendor 107, in addition to the results information generated by the workflow access system 120. Further, in one or more examples, the results information that is provided to the workflow executor 105 is filtered so that only the results information provided by other workflow executors using substantially same workflow-target system environment, for example, version, operating system, etc., as the workflow executor 105.

Providing the results information to the workflow executor 105 further includes presenting the information via the UI element, as shown at 956. Based on the results information, the workflow executor 105 may or may not execute the workflow step, as shown at 945. The workflow executor may execute the workflow step and thereby effect a change in the workflow-target system 110, as shown at 948. The change may include a hardware configuration change and/or a software configuration change as described herein. Alternatively, the workflow executor 105 may determine to skip the workflow step based on the results information, as shown at 945.

In one or more examples, regardless of whether the workflow step is executed or not, the workflow executor 105 may push updated information to the data sources 130, as shown at 955. For example, if the workflow executor 105 determines not to proceed with executing the workflow step, the workflow executor 105 may indicate as such in the data sources 130. The workflow executor 105 may decide what information is to be pushed as described herein.

If the workflow executor 105 determines to push the information about the workflow step to the data sources, the workflow access system 120 accumulates the information to be pushed to the data sources 130, as described herein, and as shown at 960. The accumulated information further includes, from the workflow executor 105 his/her rating of the workflow step execution for example based on difficulty/ease of execution of the workflow step, such as the description of the workflow being easy/complicated, shorter/longer than a predetermined number of steps, the rating of the workflow step being below/above a predetermined threshold, and the like. Further, the results information pushed may include objective data such as whether the workflow step was executed or skipped, amount of time for the execution, memory used for the execution, disk space used for the execution, and the like.

In one or more examples, the workflow access system 120 tags the results information provided by the workflow executor 105 using the predetermined results tag. Further, the workflow access system 120 pushes the information to the one or more data sources 130 along with the workflow step unique identifier, as shown at 965. Pushing the accumulated information to the data sources 130 includes validating one or more data sources 130 to push to, in one or more examples. In one or more examples, the data being pushed is further tagged with the workflow identifier.

Once the workflow step execution is completed, the method includes determining if the workflow execution is completed or if further workflow steps remain to be executed, as shown at 970. If additional workflow steps remain, the method iterates for the next workflow step until the entire workflow execution is completed. If the entire workflow execution is completed, the method includes checking with the workflow executor 105 if data associated with execution of the overall workflow is to be pushed to the data sources 130, as shown at 975. If the workflow executor 105 decides not to push any information, the method is completed.

If data is to be pushed to the data sources 130, the workflow access system 120 accumulates the data to be pushed to the one or more data sources 130, as described herein, and as shown at 980. The accumulated information may include results information for the overall workflow 125, such as ratings/information for the overall workflow. The workflow access system 120 further pushes the accumulated information to the data sources 130, as shown at 985. The workflow access system 120 pushes the data to the data sources 130 along with the workflow unique identifier for easy search and identification of the data being associated with the workflow 125.

Thus, the data sources 130 now store updated results information for the workflow 125 and workflow steps that can be retrieved when asked for by a second workflow executor using the unique identifiers. The second workflow executor can thus make informed decisions when executing the workflow 125 using the information provided by the workflow executor 105, retrieved from the data sources 130. Thus, the technical solutions described herein facilitate the workflow executor 105 to have the most updated version of a workflow step when executing a workflow, the updated version and associated information being retrieved from a trusted data source, and further results information facilitating the workflow executor 105 to decide whether to execute the workflow step based on results and ratings from other users.

The technical solutions described herein facilitate executing a machine-assisted workflow with latest updates and information, and further assisting a workflow executor with relevant information from other users who are inside or outside the workflow executor's organization, from a vendor/creator of the workflow, from the workflow executor him/herself from a prior execution, from the Internet (social media, blogs, forums, articles etc.), and other types of data sources. In one or more examples, the workflow executor and/or the vendor may identify the data sources to be identified. In one or more examples, the data sources accessed are authenticated as trusted sources prior to accessing information from the data sources. Further yet, the technical solutions described herein further facilitate the workflow executor to further embellish the data sources with information generated during execution of the workflow. The technical solutions described herein thus provide an improvement to a computer technology such as a system for executing machine-assisted workflows, with dynamic updating of the workflows and workflow steps, and providing latest updated information for the workflow steps from one or more data sources, and further facilitating pushing additional updated information to the data sources upon completion of execution of the workflow steps.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   selecting a workflow for interactive execution, the workflow comprising a sequence of workflow steps;
   pulling a preliminary update for the workflow from a data source and modifying the workflow dynamically;
   selecting a workflow step from the workflow for execution;
   pulling updated information for the workflow step from the data source and modifying the workflow step dynamically using the updated information;
   retrieving, from the data source, first results information, the first results information indicative of results of executing the updated workflow step by other users;
   in response to the first results information indicative of performing an execution, executing the workflow step using the updated workflow step, the execution comprising changing a target system;
   accumulating execution information comprising attributes associated with execution of the workflow step, and a second results information based on the execution of the workflow step; and
   pushing the execution information to the data source upon completion of the workflow step.

2. The computer-implemented method of claim 1, wherein the first results information comprises a success rating of executing the updated workflow step by the other users.

3. The computer-implemented method of claim 1, wherein the first results information comprises a success rating of executing the updated workflow step by the other users.

4. The computer-implemented method of claim 1, wherein the first results information comprises a number of times the updated workflow step has been executed by the other users, and a number of errors reported by the other users for the workflow step.

5. The computer-implemented method of claim 1, wherein the first results information is identified based on a unique identifier of the workflow step.

6. The computer-implemented method of claim 5, wherein the second results information is associated with the unique identifier of the workflow step prior to pushing the second results information to the data source.

7. The computer-implemented method of claim 1, wherein the data source is a first data source, and the first results information is retrieved from a second data source.

8. A system comprising:
a memory; and
a processor configured for machine-assisted workflow execution comprising:
- selecting a workflow for interactive execution, the workflow comprising a sequence of workflow steps;
- pulling a preliminary update for the workflow from a data source and modifying the workflow dynamically;
- selecting a workflow step from the workflow for execution;
- pulling updated information for the workflow step from the data source and modifying the workflow step dynamically using the updated information;
- retrieving, from the data source, first results information, the first results information indicative of results of executing the updated workflow step by other users;
- in response to the first results information indicative of performing an execution, executing the workflow step using the updated workflow step, the execution comprising changing a target system;
- accumulating execution information comprising attributes associated with execution of the workflow step, and a second results information based on the execution of the workflow step; and
- pushing the execution information to the data source upon completion of the workflow step.

9. The system of claim 8, wherein the first results information comprises a success rating of executing the updated workflow step by the other users.

10. The system of claim 8, wherein the first results information comprises a success rating of executing the updated workflow step by the other users.

11. The system of claim 8, wherein the first results information comprises a number of times the updated workflow step has been executed by the other users, and a number of errors reported by the other users for the workflow step.

12. The system of claim 8, wherein the first results information is identified based on a unique identifier of the workflow step.

13. The system of claim 12, wherein the second results information is associated with the unique identifier of the workflow step prior to pushing the second results information to the data source.

14. The system of claim 8, wherein the data source is a first data source, and the first results information is retrieved from a second data source.

15. A computer program product comprising a computer readable storage medium having program instructions embodied therewith, the program instructions executable by a processing circuit to cause the processing circuit to provide machine-assisted workflow execution comprising:
- selecting a workflow for interactive execution, the workflow comprising a sequence of workflow steps;
- pulling a preliminary update for the workflow from a data source and modifying the workflow dynamically;
- selecting a workflow step from the workflow for execution;
- pulling updated information for the workflow step from the data source and modifying the workflow step dynamically using the updated information;
- retrieving, from the data source, first results information, the first results information indicative of results of executing the updated workflow step by other users;
- in response to the first results information indicative of performing an execution, executing the workflow step using the updated workflow step, the execution comprising changing a target system;
- accumulating execution information comprising attributes associated with execution of the workflow step, and a second results information based on the execution of the workflow step; and
- pushing the execution information to the data source upon completion of the workflow step.

16. The computer program product of claim 15, wherein the first results information comprises a success rating of executing the updated workflow step by the other users.

17. The computer program product of claim 15, wherein the first results information comprises a success rating of executing the updated workflow step by the other users.

18. The computer program product of claim 15, wherein the first results information comprises a number of times the updated workflow step has been executed by the other users, and a number of errors reported by the other users for the workflow step.

19. The computer program product of claim 15, wherein the first results information is identified based on a unique identifier of the workflow step, and wherein the second results information is associated with the unique identifier of the workflow step prior to pushing the second results information to the data source.

20. The computer program product of claim 15, wherein the data source is a first data source, and the first results information is retrieved from a second data source.

* * * * *